United States Patent
Sakai

(10) Patent No.: US 9,448,436 B2
(45) Date of Patent: Sep. 20, 2016

(54) PLANAR LIGHT SOURCE DEVICE AND LIQUID CRYSTAL DISPLAY DEVICE EQUIPPED WITH SAME

(71) Applicant: SHARP KABUSHIKI KAISHA, Osaka-shi, Osaka (JP)

(72) Inventor: Kohji Sakai, Osaka (JP)

(73) Assignee: SHARP KABUSHIKI KAISHA, Osaka (JP)

(\*) Notice: Subject to any disclaimer, the term of this patent is extended or adjusted under 35 U.S.C. 154(b) by 164 days.

(21) Appl. No.: 14/368,173

(22) PCT Filed: Dec. 20, 2012

(86) PCT No.: PCT/JP2012/082987
§ 371 (c)(1),
(2) Date: Jun. 23, 2014

(87) PCT Pub. No.: WO2013/105407
PCT Pub. Date: Jul. 18, 2013

(65) Prior Publication Data
US 2014/0368768 A1     Dec. 18, 2014

(30) Foreign Application Priority Data
Jan. 10, 2012  (JP) ................................. 2012-002531

(51) Int. Cl.
*G02F 1/1335*   (2006.01)

(52) U.S. Cl.
CPC ... *G02F 1/133606* (2013.01); *G02F 1/133603* (2013.01); *G02F 1/133611* (2013.01); *G02F 2001/133607* (2013.01)

(58) Field of Classification Search
CPC .................... G02F 1/133606; H01L 25/0753; H01L 51/5237; G02B 6/0073; F21Y 2101/02
USPC .......... 349/64; 362/612, 235, 236, 242, 246; 313/500, 512; 345/82
See application file for complete search history.

(56) References Cited

U.S. PATENT DOCUMENTS

| | | | |
|---|---|---|---|
| 2006/0203465 A1* | 9/2006 | Chang | G02F 1/133603 362/23.18 |
| 2008/0068861 A1 | 3/2008 | Lin et al. | |
| 2010/0020267 A1 | 1/2010 | Kobayashi et al. | |
| 2010/0177499 A1 | 7/2010 | Kuromizu et al. | |

(Continued)

FOREIGN PATENT DOCUMENTS

| CN | 101042501 A | 5/2007 |
|---|---|---|
| JP | 2009-295434 A | 12/2009 |

(Continued)

*Primary Examiner* — Thanh-Nhan P Nguyen
(74) *Attorney, Agent, or Firm* — Birch, Stewart, Kolasch & Birch, LLP

(57) ABSTRACT

In the present invention, a backlight (3) serving as a planar light source unit is equipped with: multiple LEDs (12); and a bottom plate (11a) having a mounting surface (11a₁). The multiple LEDs (12) are two-dimensionally arranged on the mounting surface (11a₁) within a rectangular area (RA) that is smaller than the bottom plate (11a). In addition, the arrangement density of the LEDs in the rectangular area (RA) is lower at the center part (Rc) than at the peripheral part (Rp). The rectangular area (RA) has a corner area, where at least one LED (12) is provided, at each of the four corners thereof. The LEDs (12) positioned in the respective corner areas are installed such that the central axes of the LEDs lean toward the periphery side of the rectangular area (RA) with respect to the direction perpendicular to the mounting surface (11a₁).

20 Claims, 16 Drawing Sheets

(56) References Cited

U.S. PATENT DOCUMENTS

| | | |
|---|---|---|
| 2010/0182514 A1 | 7/2010 | Kuromizu et al. |
| 2012/0057097 A1 | 3/2012 | Shimizu |
| 2012/0087109 A1 | 4/2012 | Kobayashi et al. |
| 2012/0092592 A1* | 4/2012 | Imajo ............... G02F 1/133603 349/62 |
| 2012/0099028 A1 | 4/2012 | Yokota |
| 2012/0099046 A1 | 4/2012 | Kasai |

FOREIGN PATENT DOCUMENTS

| | | |
|---|---|---|
| JP | 2010-049993 A | 3/2010 |
| JP | 2011-90217 A | 5/2011 |
| WO | WO 2009/004840 A1 | 1/2009 |
| WO | WO 2009/004841 A1 | 1/2009 |
| WO | WO 2010/146920 A1 | 12/2010 |
| WO | WO 2010/146921 A1 | 12/2010 |
| WO | WO 2011/004637 A1 | 1/2011 |

* cited by examiner

| R11 ○△ | R12 △ | R13 △ | R14 △ | R15 △ | R16 △ | R17 ○△ |
|---|---|---|---|---|---|---|
| R21 △ | R22 □ | R23 □ | R24 □ | R25 □ | R26 □ | R27 △ |
| R31 △ | R32 □ | R33 □ | R34 □ | R35 □ | R36 □ | R37 △ |
| R41 ○△ | R42 △ | R43 △ | R44 △ | R45 △ | R46 △ | R47 ○△ |

○ : CORNER REGION (P1)
△ : OUTER PERIPHERAL REGION (P2)
□ : CENTRAL REGION (P3)

○ : CORNER REGION (P1)
△ : OUTER PERIPHERAL REGION (P2)
□ : CENTRAL REGION (P3)

PLANAR LIGHT SOURCE DEVICE AND LIQUID CRYSTAL DISPLAY DEVICE EQUIPPED WITH SAME

TECHNICAL FIELD

The present invention relates to a planar light source device in which a plurality of light sources are disposed two-dimensionally in a rectangular region on a mounting surface and to a liquid crystal display device that includes the planar light source device.

BACKGROUND ART

Conventionally, as a planar light source device that illuminates a liquid crystal panel, a so-called illumination device of direct type, which is disposed right under a rear surface of the liquid crystal panel, is proposed. As a light source of such an illumination device, it is possible to use a tube-like light source (e.g., cold-cathode tube lamp) as in patent documents 1 to 3 or use a point light source (e.g., LED (light emitting diode) as in a patent document 4. Especially, an LED is advantageous in longevity and low power consumption, and in recent years, many LEDs are used as light sources of illumination devices.

In the meantime, when humans watch a screen of a liquid crystal panel, they watch more carefully the screen center than the screen peripheral. Because of this, in a case of using LEDs as the light source, even if the disposition density of the LEDs is made low at the peripheral portion, visual brightness unevenness is not conspicuous. As described above, by partially changing the disposition density of the LEDs, it is possible to secure the brightness of a necessary region (screen center) and achieve low cost by reducing the number of LEDs mounted.

When changing partially the disposition density of the LEDs, in the patent document 4, as shown in FIG. 25, LED boards 102 mounting a plurality of LEDs 101 are disposed in parallel, and disposition intervals of the LED boards 102 are partially changed. Specifically, in a central portion Rc in an arrangement direction of the LED boards 102, the interval of neighboring LED boards 102 is made narrow, while in an outside peripheral portion Rp with respect to the central portion Rc in the arrangement direction of the LED boards 102, the interval of neighboring LED boards 102 is made wide. As described above, it is conceivable that by adjusting the interval of the LED boards 102 to change partially the disposition density of the LEDs, it is also possible to easily deal with a size change of an illumination device 100.

Besides, in the illumination device in the patent document 4, a reflection sheet 103 is disposed on a bottom plate (mounting surface) of a backlight chassis where the LED board 102 is mounted. The reflection sheet 103 has an opening portion for exposing the LED 101 and is disposed on the bottom plate to cover the LED board 102. An edge portion 103a of the reflection sheet 103 rises obliquely from the bottom plate. As described above, by disposing the reflection sheet 103, even if the LED 101 is not disposed on a peripheral portion of the bottom plate, it is possible to illuminate a screen peripheral portion of a liquid crystal panel by means of light that is emitted from the LED 101 and reflected by the edge portion 103a of the reflection sheet 103. Accordingly, it is possible to achieve low cost by further reducing the number of LEDs 101 mounted.

CITATION LIST

Patent Literature

PLT1: International Publication No. 2009/004840 pamphlet (see claim 1, FIG. 5 and the like).
PLT2: International Publication No. 2009/004841 pamphlet (see claim 1, FIG. 5 and the like).
PLT3: International Publication No. 2010/146920 pamphlet (see claim 1, FIG. 11, FIG. 12 and the like).
PLT4: International Publication No. 2010/146921 pamphlet (see claims 1, 2, paragraphs [0005], [0008], [0035], [0036], FIG. 7 and the like).

SUMMARY OF INVENTION

Technical Problem

In the meantime, in FIG. 25, the LEDs 101 are disposed in a region on the bottom plate where the edge portion 103a of the reflection sheet 103 does not exist, that is, a rectangular region of V1 (cm) height×H1 (cm) width. On the other hand, the bottom plate of the back chassis has a size of V2 (cm) height×H2 (cm) width, where V1<V2, and H1<H2. As describe above, because of the reduction in the number of LEDs 101 mounted, if the size (V1×H1) of the disposition region for the LEDs 101 becomes smaller than the size (V2×H2) of the bottom plate and the disposition density of the LEDs 101 in the disposition region becomes lower in the peripheral portion Rp than in the central portion Rc, the light has difficulty in reaching four corners of the screen of the liquid crystal panel from LEDs 101a to 101d at four corners of the disposition region. As a result of this, as shown in FIG. 26, a phenomenon easily occurs, in which the brightness in four-corner regions 201a to 201d of the screen of the liquid crystal panel declines.

The present invention has been made to solve the above problems, and it is an object of the present invention to provide: a planar light source device that is able to alleviate the brightness declining at the four corners of an illumination region of an illumination target even in a structure in which a plurality of light sources are disposed such that the disposition density becomes lower in a peripheral portion than in a central portion in a small region that is smaller than a size of a bottom plate; and a liquid crystal display device that includes the planar light source device.

Solution to Problem

A planar light source device according to an aspect of the present invention comprises: a plurality of light sources, and a bottom plate that has a mounting surface on which the plurality of light sources are mounted, wherein the plurality of light sources are two-dimensionally disposed in a rectangular region of the mounting surface that is smaller than a size of the bottom plate, and disposition density of the light sources in the rectangular region is lower in a peripheral portion than in a central portion, wherein the rectangular region has, at four corners thereof, corner regions where at least one of the light sources is disposed, and the light source located in each of the corner regions is disposed such that a central axis thereof inclines from a direction perpendicular to the mounting surface toward an outer peripheral side of the rectangular region.

A planar light source device according to another aspect of the present invention comprises: a plurality of light sources, and a bottom plate that has a mounting surface on which the plurality of light sources are mounted, wherein the plurality of light sources are two-dimensionally disposed in a rectangular region of the mounting surface that is smaller than a size of the bottom plate, and disposition density of the light sources in the rectangular region is lower in a peripheral portion than in a central portion, the planar light source device further comprising a diffusion lens that is disposed correspondingly to each of the plurality of light sources and diffuses light emitted from the light source, wherein the rectangular region has, at four corners thereof, corner regions where at least one of the light sources is disposed, and the diffusion lens corresponding to the light source located in each of the corner regions is disposed such that a central axis thereof is located at a position closer to an outer peripheral side of the rectangular region than a light emitting portion of the light source.

A planar light source device according to still another aspect of the present invention comprises: a plurality of light sources, and a bottom plate that has a mounting surface on which the plurality of light sources are mounted, wherein the plurality of light sources are two-dimensionally disposed in a rectangular region of the mounting surface that is smaller than a size of the bottom plate, and disposition density of the light sources in the rectangular region is lower in a peripheral portion than in a central portion, the planar light source device further comprising a diffusion lens that is disposed correspondingly to each of the plurality of light sources and diffuses light emitted from the light source, wherein the rectangular region has, at four corners thereof, corner regions where at least one of the light sources is disposed, and the diffusion lens corresponding to the light source located in each of the corner regions is disposed such that a central axis thereof inclines from a direction perpendicular to the mounting surface toward an outer peripheral side of the rectangular region.

A liquid crystal display device according to still another aspect of the present invention comprises: the above planar light source device, and a liquid crystal panel that modulates light supplied from the planar light source device to perform display.

Advantageous Effects of Invention

According to the present invention, by suitably setting the disposition angles of the light sources located in the four corner regions of the mounting surface, the mounting positions and mounting angles of the diffusion lenses corresponding to the light sources, even in the structure in which to achieve low cost by reduction in the number of the light sources mounted, the disposition region for the light sources is made smaller than the size of the bottom plate and the disposition density of the light sources in the disposition region is made lower in the peripheral portion than in the central portion, it is possible to alleviate the brightness declining at the four corners of the illumination region by means of illumination from the light source in each of the corner regions.

DESCRIPTION OF EMBODIMENTS

Embodiment 1

An embodiment 1 of the present invention is described based on drawings as follows. In the meantime, there is a case where structures common to each embodiment are indicated by the same member numbers and description of them is skipped.

Figure 1A:
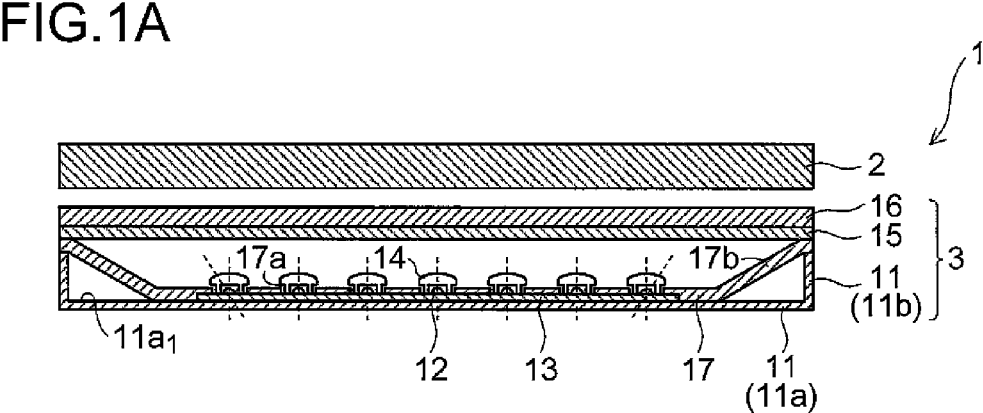
FIG. 1A is a cross-sectional view showing a schematic structure of a liquid crystal display device according to an embodiment 1 of the present invention.
Figure 1B:
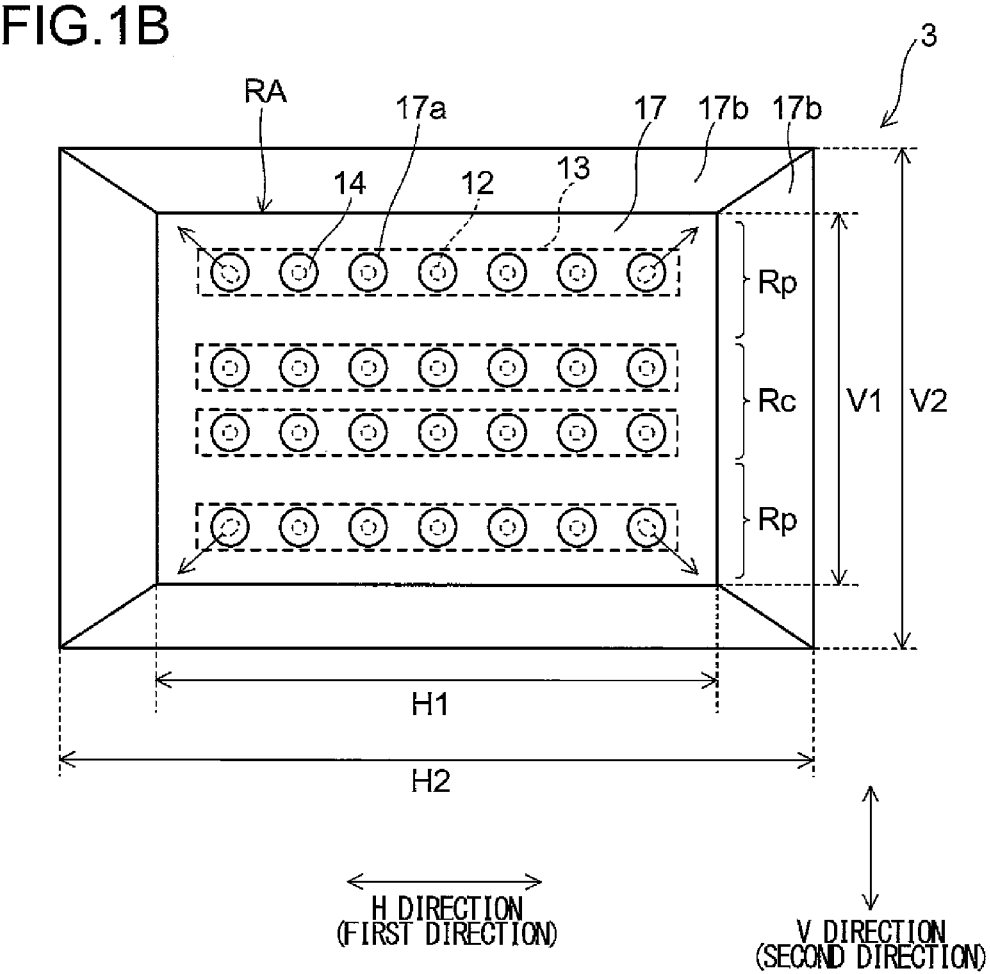
FIG. 1B is a plan view of a backlight of the above liquid crystal display device.

FIG. 1A is a cross-sectional view showing a schematic structure of a liquid crystal display device 1 according to the present embodiment, and FIG. 1B is a plan view of a backlight 3 of the liquid crystal display device 1. In the meantime, in FIG. 1B, for the sake of convenience, illustration of a diffusion plate 15 and an optical sheet 16 described later is skipped. As shown in these drawings, the liquid crystal display device 1 has a liquid crystal panel 2 and a backlight 3.

The liquid crystal panel 2 is a liquid crystal display element that modulates light supplied from the backlight 3 to display an image, and composed by sandwiching a liquid crystal layer by means of a pair of boards. One board is provided with a source wiring and a gate wiring disposed to cross each other at right angles, a switching element (e.g., TFT: Thin Film Transistor) that performs ON/OFF of driving of a pixel enclosed by the source wiring and the gate wiring adjacent to each other, a pixel electrode connected to the switching element and the like. The other board is provided with a color filter formed of color filters of R (red), G (green), and B (blue) disposed correspondingly to each pixel, a common electrode common to each pixel and the like. Besides, a side of each board facing the liquid crystal layer is provided with an orientation film that orients liquid crystal molecules, while an outer side (opposite to the liquid crystal layer) of each board is provided with a light polarization plate that transmits predetermined polarized light only.

The backlight 3 is a planar light source device (illumination device) of direct type that is disposed right under a rear surface of the liquid crystal panel 2 and illuminates the liquid crystal panel 2 in a planar manner. The backlight 3 includes a backlight chassis 11, LEDs 12 as a plurality of light sources, an LED board 13, a diffusion lens 14, a diffusion plate 15, an optical sheet 16, a reflection sheet 17, and a not-shown circuit board. The above circuit board is a circuit board that controls light emission from the LED 12, but may include a circuit board for driving the liquid crystal panel 2 and other boards (power source board, control board).

The backlight chassis 11 is a chassis member that is formed by bending a sheet metal into a predetermined shape, has a bottom plate 11a and a side plate 11b. The bottom plate 11a is formed into a rectangular shape when viewing from top, and on one surface of which (surface facing the liquid crystal panel 2) the plurality of LEDs 12 are mounted via the LED board 13. Hereinafter, this surface is called a mounting surface $11a_1$ on which the plurality of LEDs 21 are mounted. The side plate 11b is connected to an outer peripheral portion (four side edge portions of the bottom plate 11a) of the bottom plate 11a to rise substantially upright from the bottom plate 11a.

The LEDs 12 are each a light emitting diode (point light source) that has a light emitting portion 12a (see FIG. 2) and mouthed in a line on the LED board 13 as a mounting board. A plurality of the LED boards 13 are disposed in parallel on the bottom plate 11a. In this way, the plurality of LEDs 12 are disposed two-dimensionally on the bottom plate 11a. In the present embodiment, because the reflection sheet 17 described later is provided with an edge portion 17b, on the bottom plate 11a, a disposition region for the LEDs 12 is a rectangular region RA smaller than a size of the bottom plate 11a.

Here, two directions parallel to the mounting surface $11a_1$ of the bottom plate 11a and perpendicular to each other are defined as an H direction (first direction) and a V direction (second direction), respectively. In the meantime, the H direction corresponds to, for example, a long-edge direction of the rectangular region RA, while the V direction corresponds to a short-edge direction of the rectangular region. The size of the rectangular region RA is H1 (cm)×V1 (cm), while the size of the bottom plate 11a is H2 (cm)×V2 (cm), where H1<H2, V1<V2. As described above, the rectangular region RA is one size smaller than the size of the bottom plate 11a.

Besides, on the bottom plate 11a, the disposition interval of the LED boards 13 is narrow in a central portion Rc in the arrangement direction of the LED boards 13 and wide in an outer peripheral portion Rp with respect to the central portion Rc in the arrangement direction. As a result of this, the disposition density of the LEDs 12 is high in the central portion Rc of the rectangular region RA and low in the peripheral portion Rp. As described above, by partially changing the disposition density of the LEDs 12, it is possible to secure an illumination brightness in a necessary region (central region Rc) and to achieve low cost by reducing the number of LEDs 12 mounted as a whole. Besides, by adjusting the disposition interval of the LED boards 13 to partially change the disposition density of the LEDs 12, it is also possible to easily deal with a size change of the backlight 3.

The diffusion lens 14 is disposed on the LED board 13 correspondingly to each of the plurality of LEDs 12 and diffuses the light emitted from each LED 12. In the meantime, a detailed structure of the diffusion lens 14 is described later. By disposing the diffusion lens 14, the light from the LED 12 is diffused by the diffusion lens 14; accordingly, even in a case where the interval between neighboring LEDs 12 is large, dot-like unevenness becomes unlikely to occur in a brightness distribution by each LED 12. As a result of this, it is possible to achieve low cost by further reducing the number of LEDs 12 mounted. In the meantime, in a case where it is possible to amply reduce the number of LEDs 12 mounted by adjusting the above disposition interval of the LED boards 13, it is also possible to employ a structure in which the diffusion lens 14 is not disposed.

The diffusion plate 15 further diffuses and averages the light emitted from each LED 12 via the diffusion lens 14, is formed into a flat plate shape and disposed at a position closer to the liquid crystal panel 2 than the diffusion lens 14. The optical sheet 16 outputs the light, which passes through the diffusion plate 15, as planar light and is composed to include a lens sheet, a prism sheet, a retroreflection sheet and the like. Respective end portions of the diffusion plate 15 and optical sheet 16 are supported by the side plate 11b of the backlight chassis 11 via end portions of the reflection sheet 17.

The reflection sheet 17 has an opening portion 17a from which each LED 12 is exposed, is disposed on the bottom plate 11a to cover the LED board 13, and reflects the light, which is emitted from the LED 12 and directly enters the reflection sheet, and the light, which is emitted from the LED 12 and reflected by the diffusion plate 15 and the like to enter the reflection sheet, again to the liquid crystal panel 2. In this way, it is possible to improve use efficiency of the light emitted from the LED 12.

The reflection sheet 17 has the edge portion 17b that rises obliquely from the bottom plate 11a outside the rectangular region RA. In other words, the edge portion 17b is located to surround the rectangular region RA. An end portion (outer peripheral portion) of the edge portion 17b is supported from under by the side plate 11b of the backlight chassis 11.

By disposing the reflection sheet 17, even if the LEDs 12 are not disposed on the outer peripheral portions of the bottom plate 11a, it is possible to illuminate screen peripheral portions of the liquid crystal panel 2 by means of the light that is emitted from the LEDs 12 and reflected by the edge portion 17b of the reflection sheet 17. Accordingly, it is possible to achieve low cost by further reducing the number of LEDs 12 mounted all the more because the LEDs 12 are not disposed on the peripheral portions of the bottom plate 11a.

Figure 2:
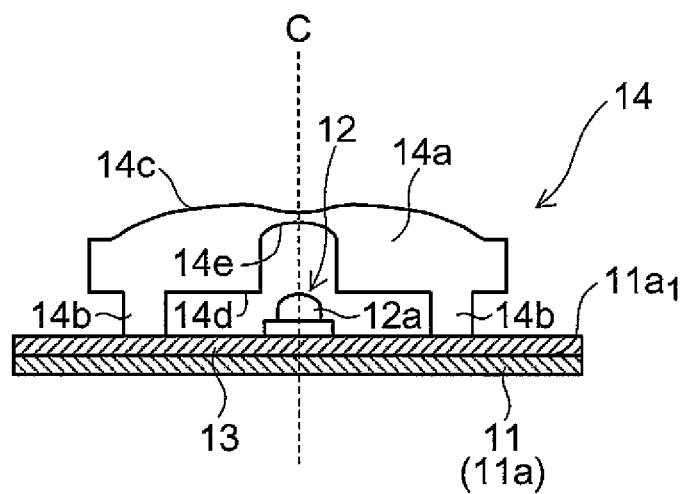
FIG. 2 is a cross-sectional view of a diffusion lens of the above backlight.

Next, details of a structure of the above diffusion lens 14 are described. FIG. 2 a cross-sectional view of the diffusion lens 14.

The diffusion lens 14 has a lens portion 14a and a plurality of leg portions 14b (e.g., three) that support the lens portion 14a on the LED board 13, and is formed into a rotator shape (circular shape when viewing from top) as a whole. The leg portions 14b are disposed at an equal interval (e.g., angle interval of 120°) in a direction along an outer circumference of the lens portion 14a, and mounted at predetermined of the LED board 13 positions by means of an adhesive (not shown), for example. By adjusting a length of each leg portion 14b, it is possible to adjust a mounting angle of the diffusion lens 14 to the LED board 13; however, in the present embodiment, the lengths of the leg portions 14b are all the same. As a result of this, a central axis (optical axis) C of the diffusion lens 14 is perpendicular to the mounting surface 11a of the bottom plate 11a.

The lens portion 14a has a light output surface (upper surface) 14c and a lower surface 14d. The light output surface 14c is formed into a concave shape recessed toward the LED 12 at a central region close to the central axis C and formed into a convex shape raised oppositely to the LED 12 in an outer circumferential region with respect to the central region in a lens radial direction. Besides, in the lower surface 14d, a portion opposite to the LED 12 has a concave portion 14e that is recessed oppositely to the LED 12.

According to such structure of the diffusion lens 14, the light emitted from the LED 12 is changed (diffused) in travelling direction to the outside by the concave portion 14e and the light output surface 14c, so that a light expansion angle becomes large.

In the meantime, the shapes of the light output surface 14c and lower surface 14d of the diffusion plate 14 are not limited to the above shapes, and whatever shapes may be employed if the shapes diffuse (enlarge the light expansion angle) the light emitted from the LED 12. Accordingly, for example, it is also possible to compose the diffusion lens 14 without disposing the concave portion recessed toward the LED 12 at the central region of the light output surface 14c, and also possible to compose the diffusion lens 14 without forming the concave portion 14e in the lower surface 14d.

Next, a structure, which alleviates a brightness decline at the screen four corners of the liquid crystal panel 2 as an illumination target, is described.

Figures 3A, 3B:
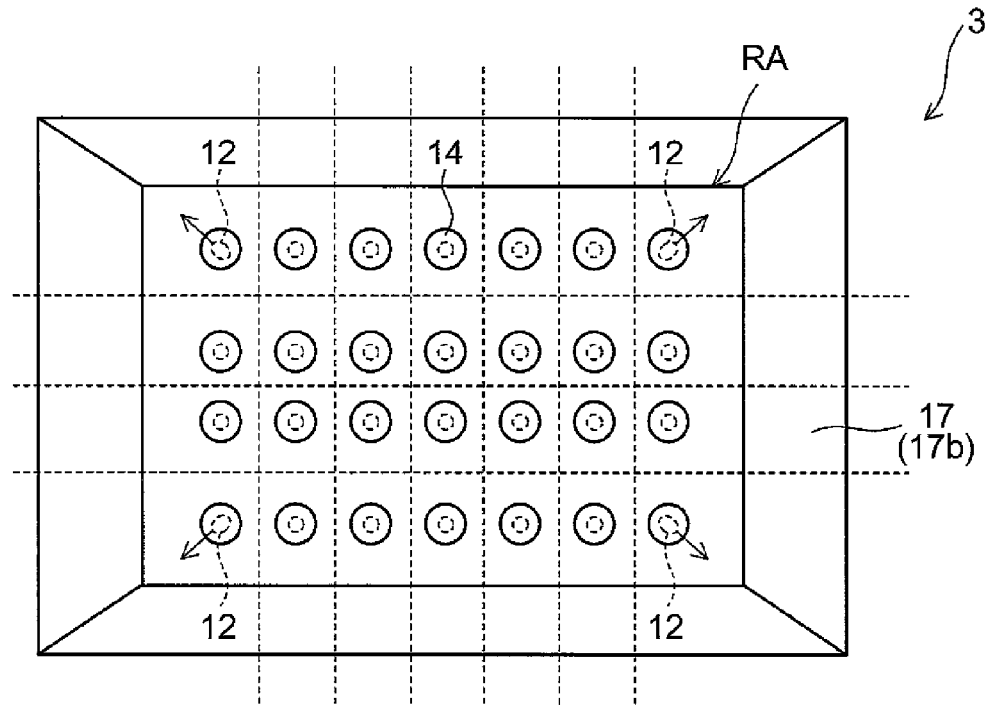
FIG. 3A is a plan view showing schematically a division example when a rectangular region on which a plurality of LEDs are disposed is divided into a plurality of regions on a bottom plate of the above backlight.
FIG. 3B is a descriptive view showing an address of each division region in the above division example.

FIG. 3A is a plan view showing schematically a division example when the rectangular region RA on which the plurality of LEDs 12 are disposed is divided into a plurality of regions on the bottom plate 11a, and FIG. 3B is a descriptive view showing addresses of the plurality of divided regions (hereinafter, also called a division region). In FIG. 3A, the rectangular region RA is divided into, for example, 7 regions in the H direction (long-edge direction) and into, for example, 4 regions in the V direction (short-edge direction); accordingly, FIG. 3B shows a total of 28 regions $R_{ij}$, where i is an integer of 1 to 4 and corresponds to a number of a row parallel to the H direction, while j is an integer of 1 to 7 and corresponds to a number of a column parallel to the V direction.

Here, for the sake of convenience for the following description, in the rectangular region RA, regions $R_{11} \cdot R_{17} \cdot R_{41} \cdot R_{47}$ located in the four corners are called corner regions P1. Besides, in the rectangular region RA, regions located in outermost peripheral portions including the four corner regions P1, namely, regions $R_{11}$ to $R_{17}$, regions $R_{21} \cdot R_{27}$, regions $R_{31} \cdot R_{37}$, and regions $R_{41}$ to $R_{47}$ are called outer peripheral regions P2. Further, in the rectangular region RA, the remaining regions except for the corner regions P1 and outer peripheral regions P2, namely, regions $R_{22}$ to $R_{26}$ and regions $R_{32}$ to $R_{36}$ located (surrounded by the outer peripheral regions P2) inside the outer peripheral regions P2 are called central regions P3. In FIG. 3B, to facilitate the identification of the corner regions P1, outer peripheral regions P2 and central regions P3, these three kinds of regions are indicated by symbols of ○, Δ, and □, respectively.

In the present embodiment, one LED 12 is disposed in each of the four corner regions P1. Besides, the above diffusion lens 14 is disposed correspondingly to each LED 12; accordingly, one diffusion lens 14 is disposed in each corner region P1.

Figure 4:
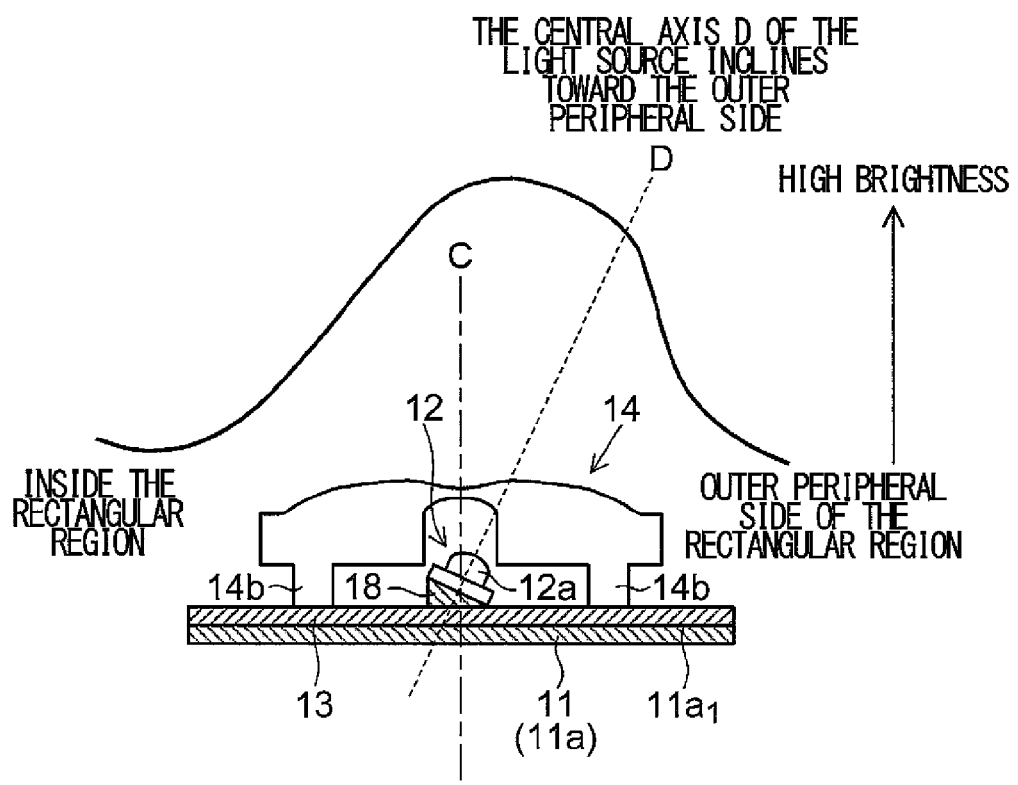
FIG. 4 is a descriptive view showing schematically LEDs disposed in four corner regions of the above rectangular region and a brightness distribution of light emitted from the LEDs via diffusion lenses.

FIG. 4 shows schematically the LEDs 12 disposed in the four corner regions P1 and a brightness distribution of the light emitted from the LEDs 12 via the diffusion lenses 14. In the present embodiment, the LED 12 located in each corner region P1 is disposed such that a central axis D thereof inclines from a direction perpendicular to the bottom plate 11a (mounting surface 11a₁) toward the outer peripheral side of the rectangular region RA, especially toward each apex of the four corners of the rectangular region RA. In the meantime, in FIG. 3A, an arrow attached to the LED 12 indicates the direction in which the central axis D of the LED 12 inclines, and other drawings appearing in the present embodiment are illustrated in the same way as this. Besides, as to the LED 12 with no arrow attached, the central axis D is in the direction perpendicular to the bottom plate 11a.

In the meantime, the central axis D of the LED 12 has the same meaning as a central axis (optical axis) of the light flux emitted from the LED 12. In other words, an axis, which passes through the light emitting portion 12a of the LED 12 and a position where intensity (radiation intensity) of the light emitted from the LED 12 becomes the highest, is defined as the central axis D of the LED 12.

Here, in the present embodiment, to incline the central axis D of the LED 12 as described above, the LED 12 is mounted on the LED board 13 via a support member 18. The support member 18 is formed into a triangle pole shape that has a right triangle in cross section and disposed sideways on the LED board 13. Accordingly, by disposing the LED 12 onto a surface of the support member 18 inclined by an acute angle to the LED board 13 and disposing the support member 18 onto the LED board 13 such that a normal of the surface of the support member 18 faces each apex of the four corners of the rectangular region RA, it is possible to incline the central axis D of the LED 12 as described above.

As described above, in the four corner regions P1, by disposing the LED 12 such that the central axis D of the LED 12 inclines toward the outer peripheral side of the rectangular region RA, as shown in FIG. 4, in the brightness distribution of the light emitted from each LED 12 in each corner region P1, it is possible to raise the illumination brightness on the side (outer peripheral side of the rectangular region RA) toward which the central axis D inclines with respect to an axis (e.g., central axis C of the diffusion lens 14) that passes through the LED 12 (light emitting portion 12a) and is perpendicular to the mounting surface 11$a_1$. In this way, even in the structure in which low cost is achieved by reduction in the number of LEDs 12 mounted, namely, even in the structure in which the disposition region for the LEDs 12 is made smaller than the size of the bottom plate 11a and the disposition density of the LEDs 12 in the disposition region is made lower in the peripheral portion Rp than in the central portion Rc, it is possible to alleviate the brightness declining at the four corners of the illumination region by means of the illumination by the LED 12 in each corner region P1.

Especially, in a case where the number of LEDs 12 mounted is further reduced, or in a case where thickness reduction of the backlight 3 is pursued, the brightness at the four corners of the illumination region easily declines; accordingly, as described above, the structure in which the LED 12 inclines to alleviate the brightness decline at the four corners becomes very effective.

Besides, in the liquid crystal display device 1 that illuminates the liquid crystal panel 2 by means of the backlight 3 having the above structure, it is possible to alleviate the brightness declining at the four corners of the screen of the liquid crystal panel 2; accordingly, it is possible to improve display quality.

Besides, the LED 12 located in each corner region P1 is disposed such that the central axis D thereof inclines toward each apex of the four corners of the rectangular region RA; accordingly, it is possible to surely supply the light to the four corners of the illumination region by means of the illumination by the LED 12 in each corner region P1. Accordingly, it is possible to surely alleviate the brightness declining at the four corners of the illumination region.

In the meantime, the above effects are obtainable even in a case where the diffusion lens 14 is not disposed over the light emitting side of the LED 12. However, in the case where the diffusion lens 14 is disposed, the light from the LED 12 is diffused by the diffusion lens 14, so that the brightness decline at the four corners of the illumination region becomes less conspicuous; accordingly, in this point, it is desirable to employ the structure in which the diffusion lens 14 is disposed.

Besides, in the backlight 3 of direct type that illuminates the liquid crystal panel 2 from right under, brightness unevenness (e.g., brightness decline at the four corners of the screen) easily occurs in the liquid crystal panel 2 compared to an edge-light type that shines light onto an end surface of a light guide plate to illuminate the liquid crystal panel 2 in a planar manner. Accordingly, the above structure, which alleviates the brightness decline at the four corners of the screen by disposing and inclining the LED 12 in each corner region P1, becomes very effective.

Besides, in the case where the LED 12 is used as the light source of the backlight 3, the brightness decline due to the reduction in the number of light sources mounted easily occurs at the four corners of the screen compared to a case where a tube-like light source (e.g., cold-cathode tube) is used. Accordingly, in the case where the LED 12 is used as the light source, the above structure, which alleviates the brightness decline at the four corners of the screen by disposing and inclining the LED 12 in each corner region P1, becomes very effective.

Besides, in the case where the diffusion sheet 17 is disposed in the backlight 3, as described above, it is possible to illuminate the screen peripheral portion of the liquid crystal panel 2 by means of the light reflected by the edge portion 17b of the reflection sheet 17. However, in this case, the LED 12 is not disposed on the peripheral portion of the bottom plate 11a; accordingly, it is possible to reduce the number of LEDs 12 mounted, but the light has difficulty in reaching the four corners of the screen of the liquid crystal panel 2. Accordingly, in the case where the liquid crystal panel 2 is illuminated by means of the edge portion 17b of the reflection sheet 17 (case where the reduction in the number of LEDs 12 mounted is achieved), to alleviate the brightness decline at the four corners of the screen, the structure which inclines the LED 12 in each corner region P1 becomes very effective.

In the meantime, hereinbefore, the structure is described, in which one LED 12 is disposed in each division region of the rectangular region RA and one LED 12 in the corner region P1 is inclined; however, a structure may be employed, in which a plurality of LEDs 12 are disposed in each division region and the plurality of LEDs 12 in the corner region P1 are inclined. In other words, in the case where the total number of LEDs 12 is constant, a structure may be employed, which relatively reduces the number of division regions, increases the number of LEDs 12 disposed in one division region, and inclines the plurality of LEDs 12 in the corner region P1. Hereinafter, this point is described more specifically.

Figure 5A:
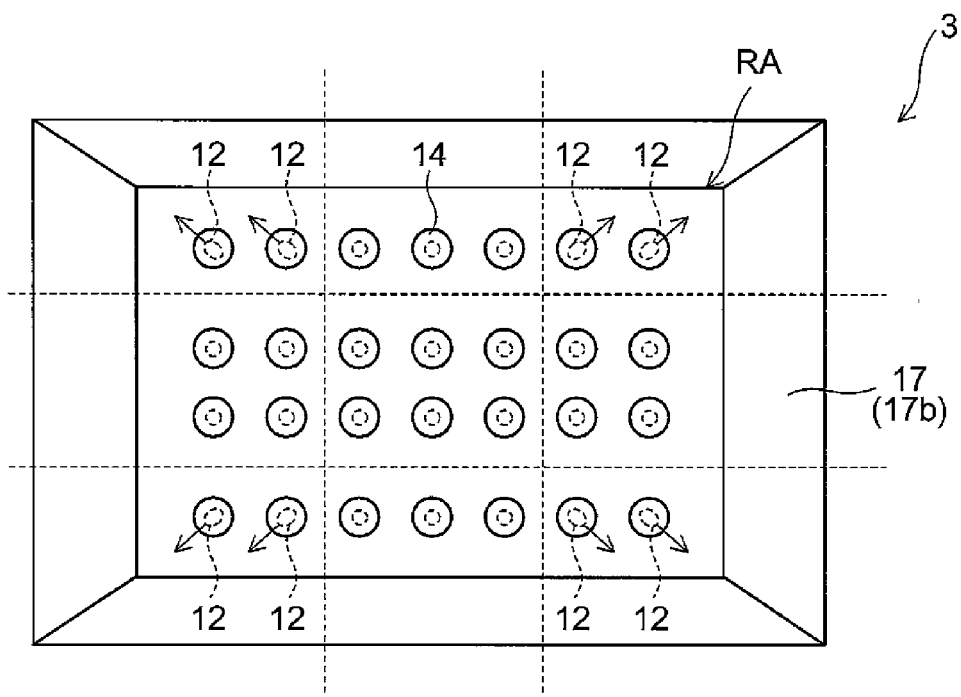
FIG. 5A is a plan view showing schematically another division example of the above rectangular region.
Figure 5B:
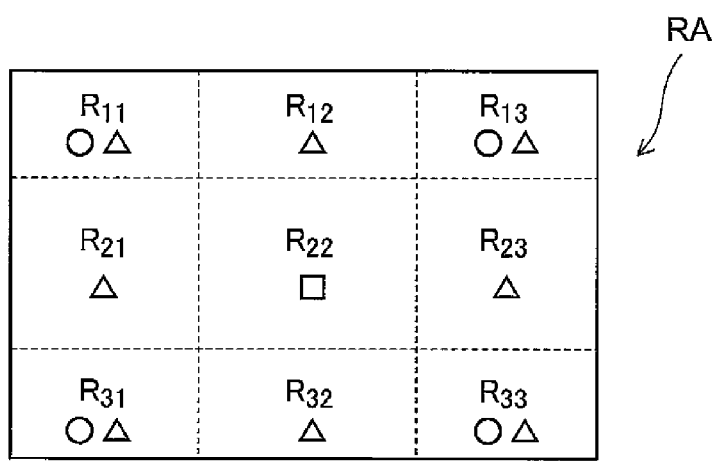
FIG. 5B is a descriptive view showing an address of each division region in the above division example.

FIG. 5A is a plan view showing schematically another division example of the rectangular region RA, and FIG. 5B is a descriptive view showing an address of each division region. In FIG. 5A, the rectangular region RA is divided into, for example, 3 regions in the H direction and into, for example, 3 regions in the V direction; accordingly, FIG. 5B shows a total of 9 regions $R_{ij}$, where i is an integer of 1 to 3 and corresponds to a number of a row parallel to the H direction, while j is an integer of 1 to 3 and corresponds to a number of a column parallel to the V direction.

Here, in the rectangular region RA, regions $R_{11} \cdot R_{13} \cdot R_{31} \cdot R_{33}$ located in the four corners are called the corner regions P1. Besides, in the rectangular region RA, regions located in the outermost peripheral portions including the four corner regions P1, namely, regions $R_{11}$ to $R_{13}$, regions $R_{21} \cdot R_{23}$, regions $R_{31}$ to $R_{33}$ are called the outer peripheral regions P2. Further, in the rectangular region RA, regions except for the corner regions P1 and outer peripheral regions P2, namely, a regions $R_{22}$ located (surrounded by the outer peripheral regions P2) inside the outer peripheral regions P2 is called the central regions P3. In FIG. 5B, to facilitate the identification of the corner regions P1, outer peripheral regions P2 and central regions P3, these three kinds of regions are indicated by symbols of ○, Δ, and □, respectively.

In the case where the total number of LEDs 12 is the same as in FIG. 3A and FIG. 3B and the number of division regions in the rectangular region RA is reduced as in FIG. 5A and FIG. 5B, the number of LEDs 12 disposed in one division region increases from the case of FIG. 3A and FIG. 3B. In this example, two LEDs 12 are disposed in each corner region P1. In the meantime, the above diffusion lens 14 is disposed correspondingly to each LED 12; accordingly, also two diffusion lenses 14 are disposed in each corner region P1.

As described above, by disposing the plurality of LEDs 12 in the corner regions P1 such that the central axis D inclines toward the outer peripheral side of the rectangular region RA, the amount of the light supplied to the four corners of the illumination region by the plurality of LEDs 12 in the corner regions P1 increases compared to the structure in which one LED 12 is inclined. Accordingly, it is possible to more alleviate the brightness decline at the four corners of the illumination region.

From the above description, it can be said preferable if the rectangular region RA in which the LEDs 12 are disposed has, at the four corners, the corner regions P1 in each of which at least one LED 12 is disposed and the LED 12 located in each corner region P1 is disposed such that the central axis D thereof inclines toward the outer peripheral side of the rectangular region RA.

Besides, to secure a high illumination brightness at the central portion of the illumination region while alleviating the brightness decline at the four corners of the illumination region by means of the LEDs 12 in the four corner regions P1, it is necessary to illuminate the central portion of the illumination region by means of LEDs 12 in the central region of the rectangular region RA while preventing the central axes D of the LEDs 12 in the central region from inclining toward the outer peripheral side of the rectangular region RA. At this time, for example, if the rectangular region RA is divided into a total of four regions with divided into 2 regions in the H direction and divided into 2 regions in the V direction, all of these four regions become the corner regions P1 that include each apex of the four corners, and the central axes D of all the LEDs 12 incline toward the outer peripheral side. In other words, in this case, it is impossible to allow a region, in which the central axis D of the LED 12 does not incline, to exist in the rectangular region RA.

Accordingly, in the present embodiment, by dividing the rectangular region RA into at least 9 regions with divided into 3 or more regions in the H direction and divided into 3 or more regions in the V direction, it is possible to surely alleviate the brightness decline at the four corners of the illumination region by means of the LED 12 in each corner region P1 while surely achieving improvement in the illumination brightness at the central portion of the illumination region by means of the LED 12 located in a region (e.g., central region P3) except for each corner region P1. At this time, each corner region P1 becomes a region where both-end regions when the rectangular region RA is divided into three or more regions in the H direction and both-end regions when the rectangular region RA is divided into three or more regions in the V direction overlie each other.

Besides, hereinbefore, the example is described, in which each central axis D of the LED 12 in each corner region inclines toward each corresponding apex of the four corners from the direction perpendicular to the bottom plate 11a (mounting surface 11a); however, if the central axis D inclines toward the outer peripheral side of the rectangular region RA, the inclination direction is not limited to the direction toward each apex of the four corners.

Figure 6:
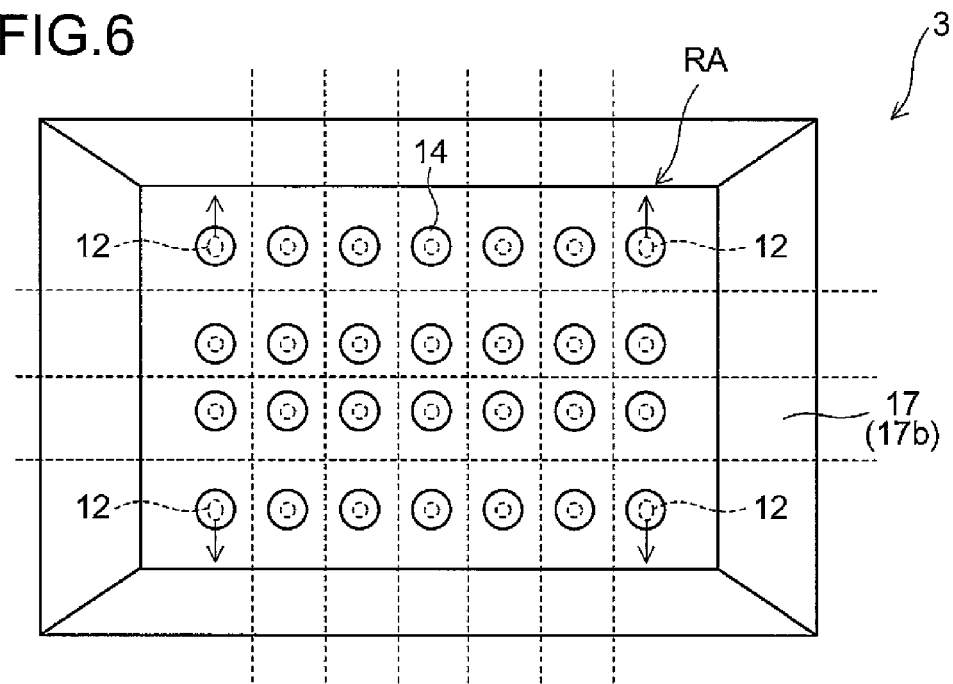
FIG. 6 is a plan view showing another structure of the above backlight.
Figure 7:
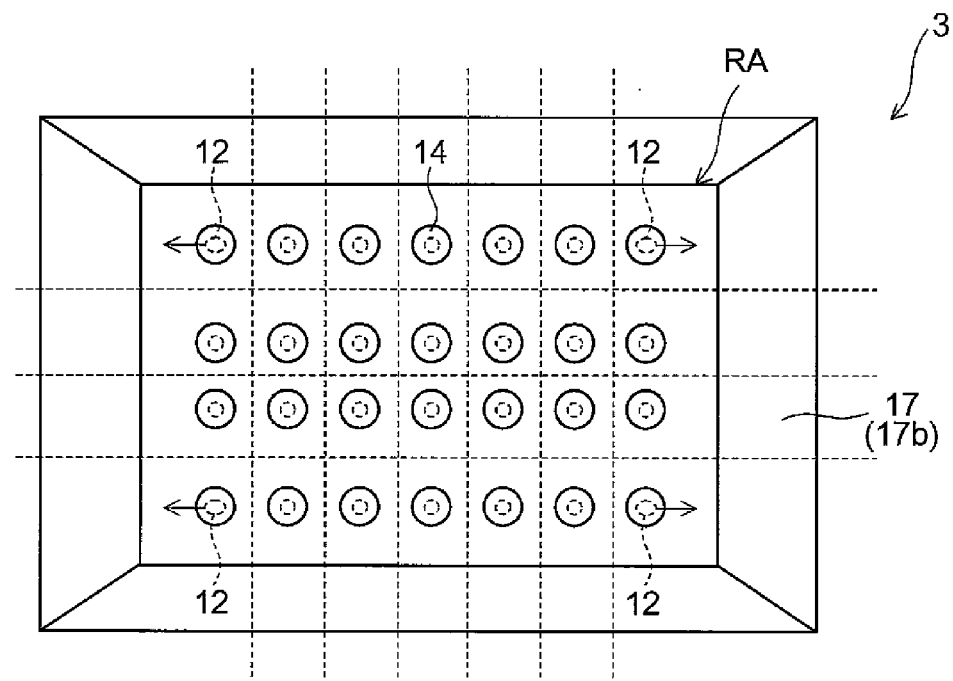
FIG. 7 is a plan view showing still another structure of the above backlight.

FIG. 6 is a plan view showing another structure of the backlight 3, and FIG. 7 is a plan view showing still another structure of the backlight 3. As shown in FIG. 6 and FIG. 7, the LED 12 in each corner region P1 may be disposed such that the central axis D thereof inclines from the direction perpendicular to the bottom plate 11a (mounting surface $11a_1$) toward a long edge or a short edge of the rectangular region RA.

Figure 8:
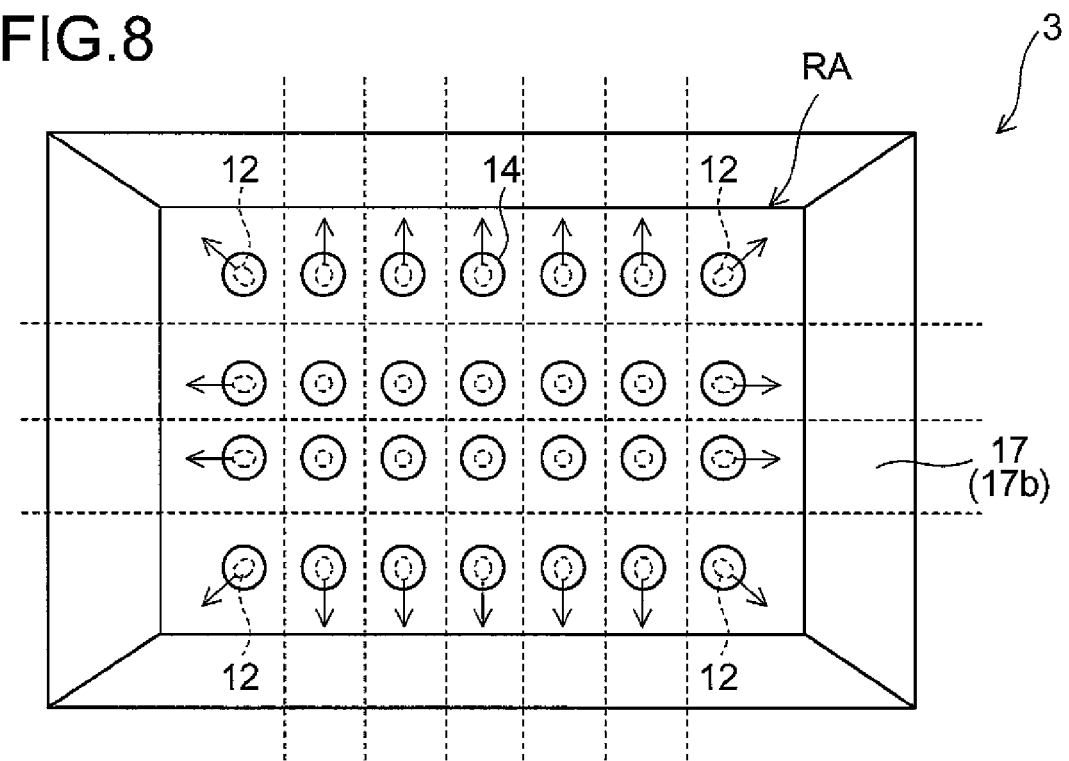
FIG. 8 is a plan view showing still another structure of the above backlight.

Besides, FIG. 8 is a plan view showing still another structure of the backlight 3. The LEDs 12 located in the outer peripheral region P2 (see FIG. 3B, FIG. 5B) may be disposed such that each central axis D inclines from the direction perpendicular to the bottom plate 11a (mounting surface $11a_1$) toward the outer peripheral side (long edge, short edge) of the rectangular region RA.

In this case, in the brightness distribution of the light emitted from the LED 12 in the outer peripheral region P2, it is possible to raise the brightness on the side (outer peripheral side of the rectangular region RA) toward which the central axis D inclines with respect to the axis that passes through the LED 12 and is perpendicular to the mounting surface $11a_1$. In this way, it is possible to alleviate the brightness declining not only at the four corners of the illumination region but also at the outer peripheral portion, and for example, it is possible to alleviate frame-shaped brightness unevenness occurring on the display screen of the liquid crystal panel 2. Accordingly, it is possible to further reduce the number of light sources in the outer peripheral region. In addition, by illuminating the central portion of the illumination region by means of the LEDs 12 located in the region (central region P3) inside the outer peripheral region P2, it is possible to obtain the above effects while securing the brightness at the central portion.

Embodiment 2

An embodiment 2 of the present invention is described based on drawings as follows.

Figure 9:
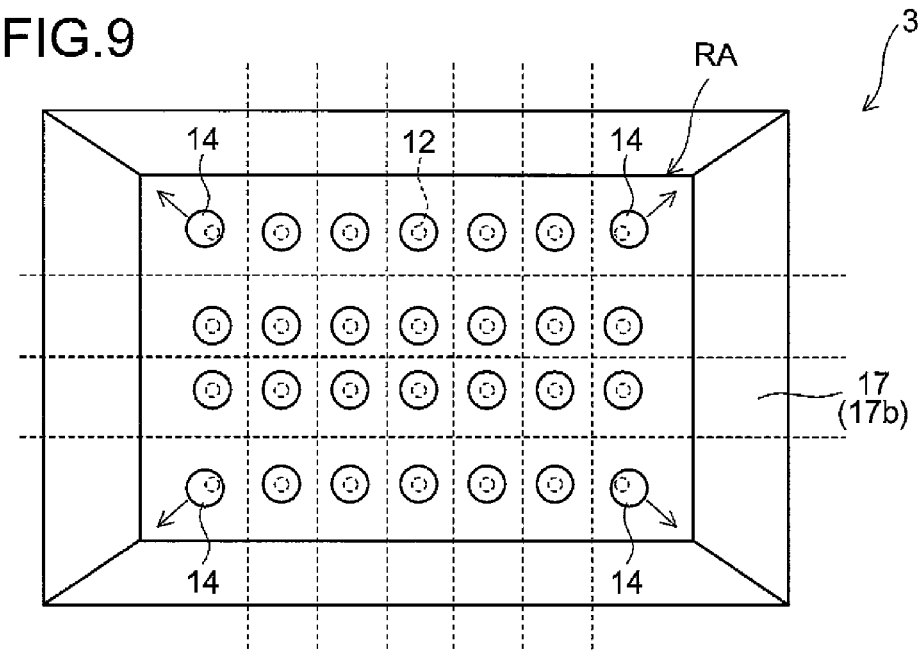
FIG. 9 is a plan view of a backlight according to an embodiment 2 of the present invention.

FIG. 9 is a plan view of the backlight 3 according to the present embodiment. In the meantime, in FIG. 9, for the sake of convenience, the illustration of the diffusion plate 15 and optical sheet 16 is skipped. In the present embodiment, instead of inclining the LED 12 located in each corner region P1 of the rectangular region RA in the structure according to the embodiment 1, the position of the diffusion lens 14 corresponding to the above LED 12 is deviated with respect to the LED 12. In more detail, the diffusion lens 14 corresponding to the LED 12 in each corner region P1 is disposed such that the central axis C thereof inclines toward the outer peripheral side of the rectangular region RA, especially toward each apex of the four corners of the rectangular region RA with respect to the light emitting portion 12a of the LED 12.

In the meantime, in FIG. 9, an arrow attached to the diffusion lens 14 indicates the direction in which the diffusion lens 14 deviates with respect to the LED 12, and other drawings appearing in the present embodiment are illustrated in the same way as this. Besides, as to the diffusion lens 14 with no arrow attached, the central axis C does not deviate (passes through the light emitting portion 12a) from the light emitting portion 12a of the LED 12.

Figure 10:
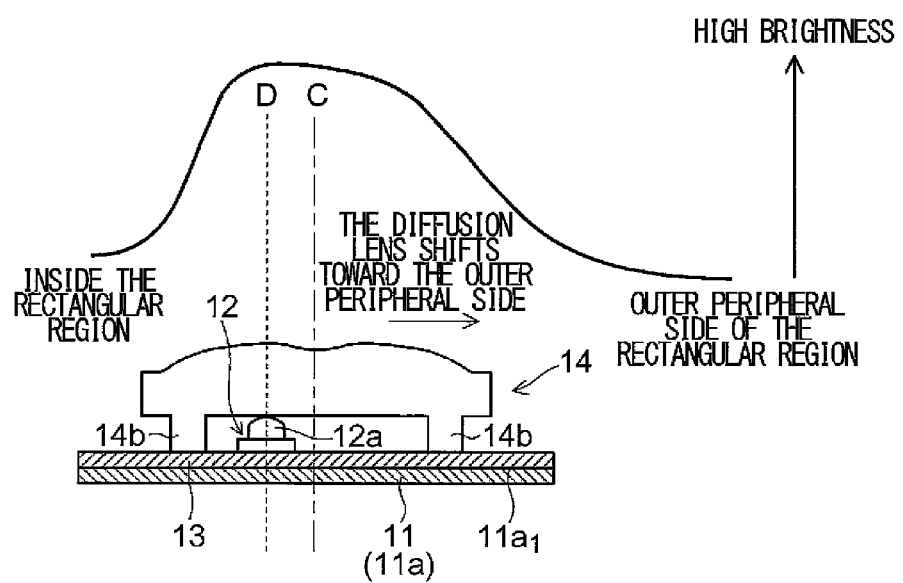
FIG. 10 is a descriptive view showing schematically LEDs disposed in four corner regions of a rectangular region on which a plurality of LEDs are disposed on a bottom plate of the above backlight and a brightness distribution of light emitted from the LEDs via diffusion lenses.

FIG. 10 shows schematically the LEDs 12 disposed in the four corner regions P1 and a brightness distribution of the light emitted from the LEDs 12 via the diffusion lenses 14. In the present embodiment, the central axis C of the diffusion lens 14 corresponding to the LED 12 in each corner region P1 is located at a position closer to the outer peripheral side of the rectangular region RA than the light emitting portion 12a of the LED 12, so that in the above brightness distribution, it is possible to raise the brightness on the outer peripheral side (side toward which the diffusion lens 14 deviates) of the rectangular region RA compared to the case where the diffusion lens 14 is not deviated. In this way, even in the structure in which to achieve low cost by reduction in the number of LEDs 12 mounted, the disposition region for the LEDs 12 is made smaller than the size of the bottom plate 11a and the disposition density of the LEDs 12 in the disposition region is made lower in the peripheral portion Rp than in the central portion Rc, it is possible to alleviate the brightness declining at the four corners of the illumination region by means of the illumination by the LED 12 in each corner region P1.

Especially, in the corner region P1, the diffusion lens 14 is disposed such that the central axis C of the diffusion lens 14 is located at a position closer to each apex of the four corners of the rectangular region RA than the light emitting portion 12a of the LED 12; accordingly, it is possible to surely supply the light to the four corners of the illumination region by means of the illumination by the LED 12 in each corner region P1 and to surely alleviate the brightness declining at the four corners of the illumination region.

Figure 11:
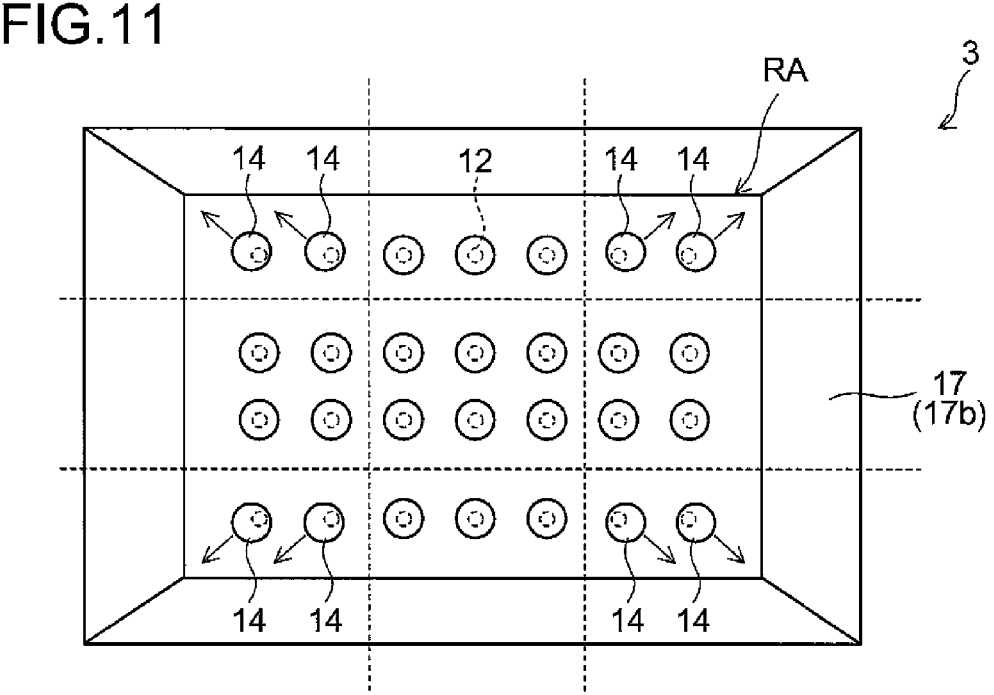
FIG. 11 is a plan view showing schematically another division example of the above rectangular region.

Here, FIG. 11 is a plan view showing schematically another division example of the rectangular region RA of the backlight 3 according to the present embodiment. In the meantime, in FIG. 11, for the sake of convenience, the illustration of the diffusion plate 15 and optical sheet 16 is skipped. As shown in the drawing, to dispose a plurality of the LEDs 12 in one division region, the rectangular region RA on the bottom plate 11a may be divided into 3×3 regions, namely, a total of 9 regions, and the diffusion lenses 14 corresponding to the plurality of LEDs 12 (two in FIG. 11) in each corner region P1 may be disposed such that the central axes C are located at positions closer to the outer peripheral side of the rectangular region RA than the light emitting portions 12a of the LEDs 12.

In this case, the amount of the light that is emitted from the LEDs 12 in the corner regions P1 and supplied to the four corners of the illumination region via the diffusion lenses 14 increases compared to the structure in which only one diffusion lens 14 in the corner region P1 is deviated toward the outer peripheral side. Accordingly, it is possible to more alleviate the brightness decline at the four corners of the illumination region.

From the above description, it can be said preferable if the rectangular region RA in which the LEDs 12 are disposed has, at the four corners, the corner regions P1 in each of which at least one LED 12 is disposed and the diffusion lens 14 corresponding to the LED 12 located in each corner region P1 is disposed such that the central axis C thereof is located at a position closer to the outer peripheral side of the rectangular region RA than the light emitting portion 12a of the LED 12.

Besides, if the diffusion lens 14 is disposed in each corner region P1 such that the central axis C of the diffusion lens 14 is located at a position closer to the outer peripheral side of the rectangular region RA than the light emitting portions 12a of the LEDs 12, the direction, in which the diffusion lens 14 deviates with respect to the light emitting portion 12a, is not limited to the direction toward each apex of the four corners.

Figure 12:
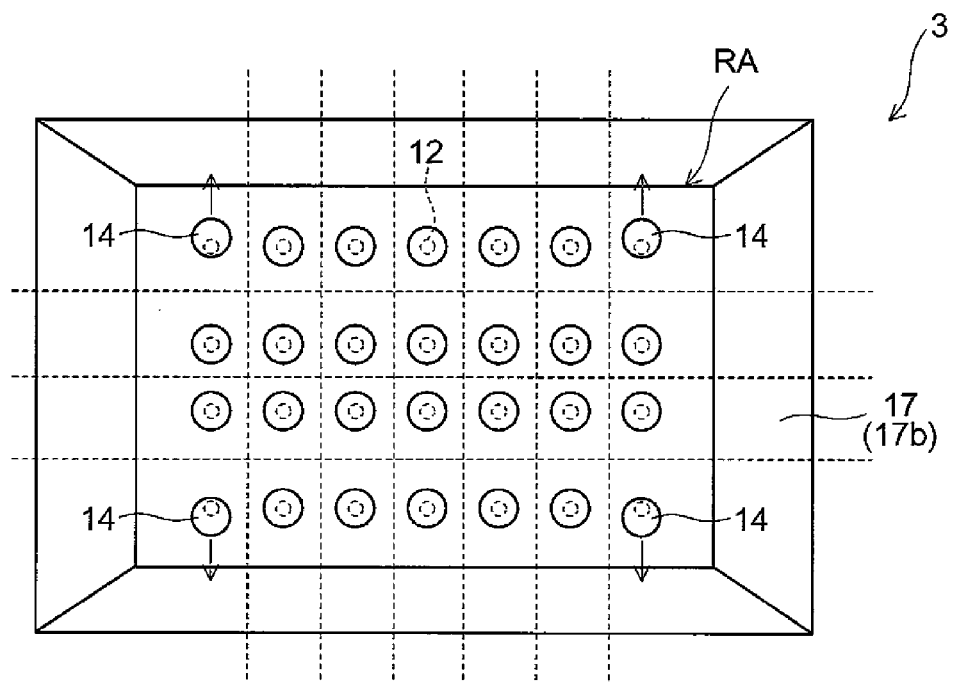
FIG. 12 is a plan view showing another structure of the above backlight.
Figure 13:
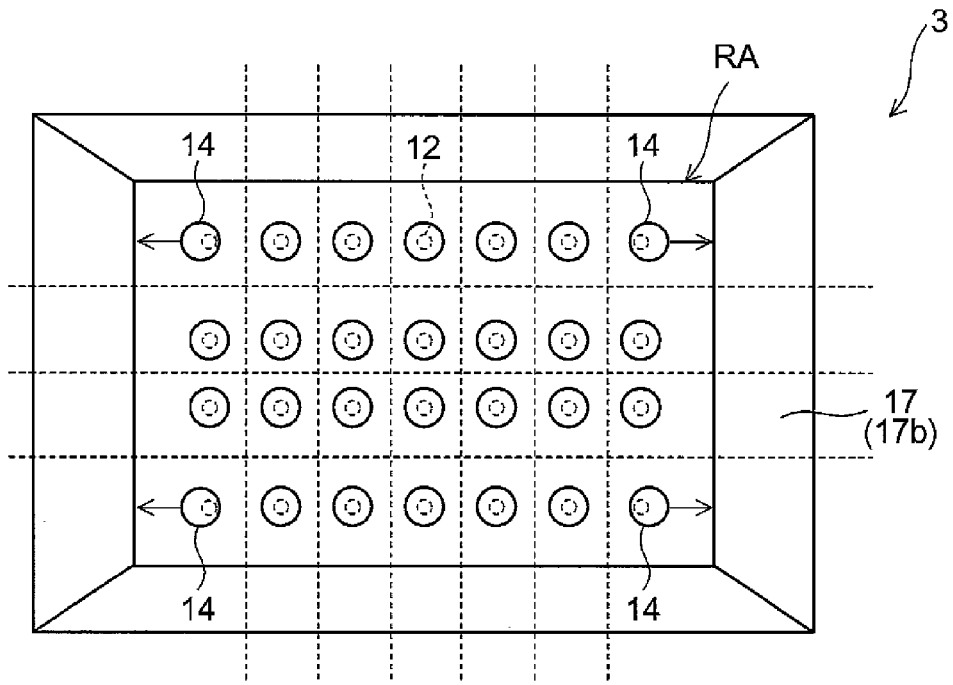
FIG. 13 is a plan view showing still another structure of the above backlight.

FIG. 12 is a plan view showing another structure of the backlight 3 according to the present embodiment, and FIG. 13 is a plan view showing still another structure of the backlight 3. As shown in FIG. 12 and FIG. 13, the diffusion lens 14 in each corner region P1 may be disposed such that the central axis C thereof is located at a position closer to the long edge or the short edge of the rectangular region RA than the light emitting portion 12a.

Figure 14:
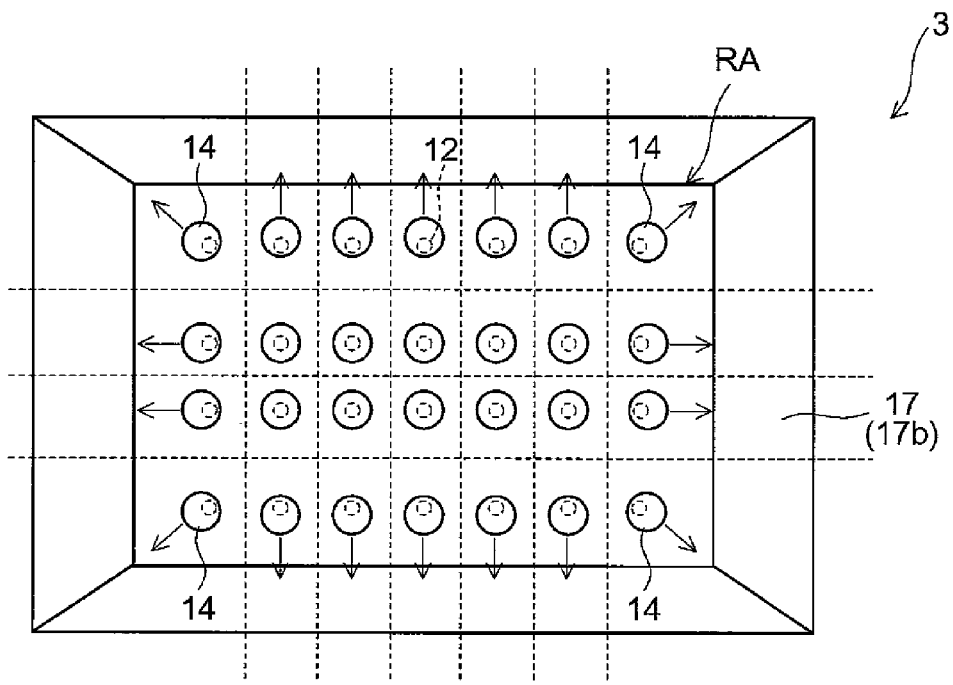
FIG. 14 is a plan view showing still another structure of the above backlight.

Besides, FIG. 14 is a plan view showing still another structure of the backlight 3. The diffusion lens 14 corresponding to the LED 12 located in the outer peripheral region P2 (see FIG. 3B, FIG. 5B) may be disposed such that the central axis C is located at a position closer to the outer peripheral side (long edge, short edge) of the rectangular region RA than the light emitting portions 12a.

In this case, in a brightness distribution of the light that is emitted from the LED 12 in the outer peripheral region P2 and obtained via the diffusion lens 14, it is possible to raise the brightness on the outer peripheral side (side toward which the diffusion lens 14 deviates) of the rectangular region RA with respect to the axis (e.g., central axis D) that passes through the light emitting portion 12a of the LED 12 and is perpendicular to the mounting surface $11a_1$ compared to the case where the diffusion lens 14 is not deviated. In this way, it is possible to alleviate the brightness declining not only at the four corners of the illumination region but also at the outer peripheral portion, and it is possible to alleviate the frame-shaped brightness unevenness occurring on the display screen of the liquid crystal panel 2, for example. Accordingly, it is possible to further reduce the number of light sources in the outer peripheral region. In addition, by illuminating the central portion of the illumination region by means of the LEDs 12 located in the region (central region P3) inside the outer peripheral region P2, it is possible to obtain the above effects while securing the brightness at the central portion.

Embodiment 3

An embodiment 3 of the present invention is described based on drawings as follows.

Figure 15:
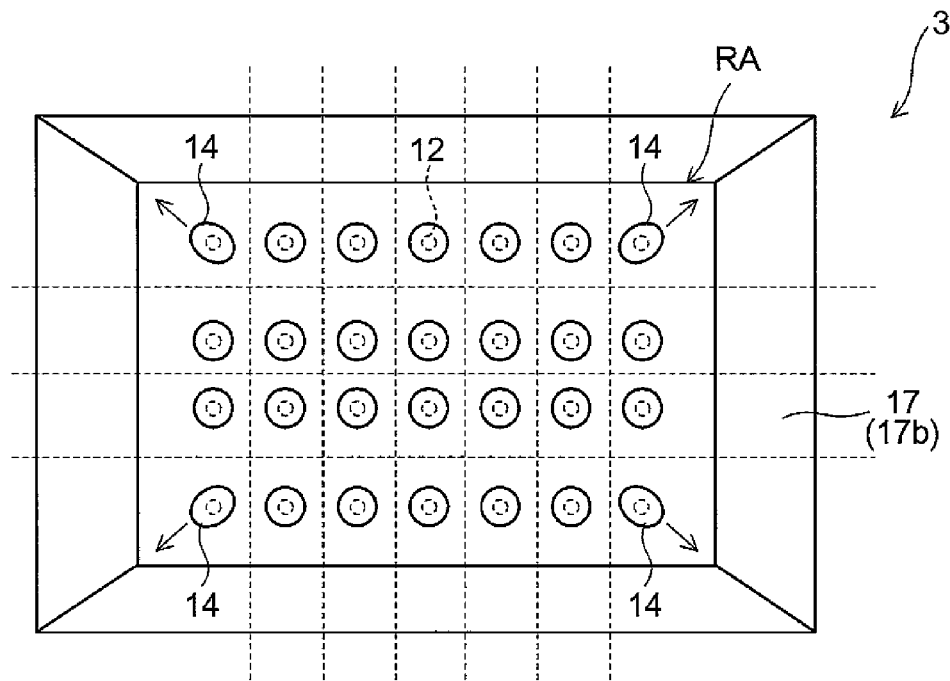
FIG. 15 is a plan view of a backlight according to an embodiment 3 of the present invention.

FIG. 15 is a plan view of the backlight 3 according to the present embodiment. In the meantime, in FIG. 15, for the sake of convenience, the illustration of the diffusion plate 15 and optical sheet 16 is skipped. In the present embodiment, instead of inclining the LED 12 located in each corner region P1 of the rectangular region RA in the structure according to the embodiment 1, the diffusion lens 14 corresponding to the above LED 12 is inclined and disposed. In more detail, the diffusion lens 14 corresponding to the LED 12 in each corner region P1 is disposed such that the central axis C thereof inclines from the direction perpendicular to the mounting surface 11a (bottom plate 11a) toward the outer peripheral side of the rectangular region RA, especially toward each apex of the four corners of the rectangular region RA. Besides, in the present embodiment, the above diffusion lens 14 is disposed such that the central axis C thereof passes through the light emitting portion 12a of the LED 12.

In the meantime, in FIG. 15, an arrow attached near the diffusion lens 14 indicates a direction in which the central axis C of the diffusion lens 14 inclines from the direction perpendicular to the mounting surface $11a_1$, and other drawings appearing in the present embodiment are illustrated in the same way as this. Besides, as to the diffusion lens 14 with no arrow attached, the central axis C does not incline (direction perpendicular to the mounting surface $11a_1$).

Here, in the present embodiment, to incline the central axis C of the diffusion lens 14 as described above, the length of the leg portion 14b of the diffusion lens 14 is adjusted. For example, by forming the length of the leg portion 14b of the plurality of leg portions 14b furthest from the outer peripheral side of the rectangular region RA to be longer than the leg portion 14b closest to the outer peripheral side of the rectangular region RA, it is possible to incline the central axis C from the direction perpendicular to the bottom plate 11a toward the above outer peripheral side. In the meantime, also as to the leg portions 14b other than the above leg portion, the length may be suitably adjusted in accordance with the inclination direction and inclination angle of the central axis C.

Figure 16:
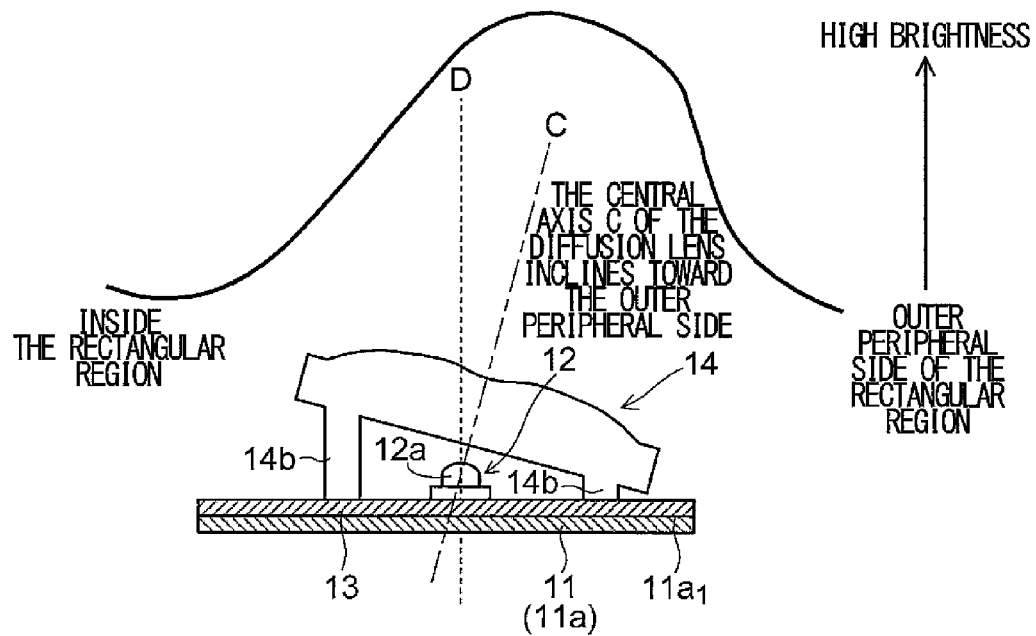
FIG. 16 is a descriptive view showing schematically LEDs disposed in four corner regions of a rectangular region on which a plurality of LEDs are disposed on a bottom plate of the above backlight and a brightness distribution of light emitted from the LEDs via diffusion lenses.

FIG. 16 shows schematically the LEDs 12 disposed in the four corner regions P1 and a brightness distribution of the light emitted from the LEDs 12 via the diffusion lenses 14. In the present embodiment, the central axis C of the diffusion lens 14 corresponding to the LED 12 in each corner region P1 inclines to lean from the direction perpendicular to the mounting surface $11a_1$ (bottom plate 11a) toward the outer peripheral side of the rectangular region RA, so that in the above brightness distribution, it is possible to raise the brightness on the outer peripheral side (side toward which the diffusion lens 14 inclines) of the rectangular region RA with respect to the axis (e.g., central axis D of the LED 12) that passes through the light emitting portion 12a and is perpendicular to the mounting surface $11a_1$ compared to the case where the diffusion lens 14 does not incline. In this way, even in the structure in which to achieve low cost by reduction in the number of LEDs 12 mounted, the disposition region for the LEDs 12 is made smaller than the size of the bottom plate 11a and the disposition density of the LEDs 12 in the disposition region is made lower in the peripheral portion Rp than in the central portion Rc, it is possible to alleviate the brightness declining at the four corners of the illumination region by means of the illumination by the LED 12 in each corner region P1.

Especially, in the corner region P1, the diffusion lens 14 is disposed such that the central axis C thereof inclines from the direction perpendicular to the mounting surface $11a_1$ (bottom plate 11a) toward each apex of the four corners of the rectangular region RA; accordingly, it is possible to surely supply the light to the four corners of the illumination region by means of the illumination by the LED 12 in each corner region P1 and to surely alleviate the brightness declining at the four corners of the illumination region.

Figure 17:
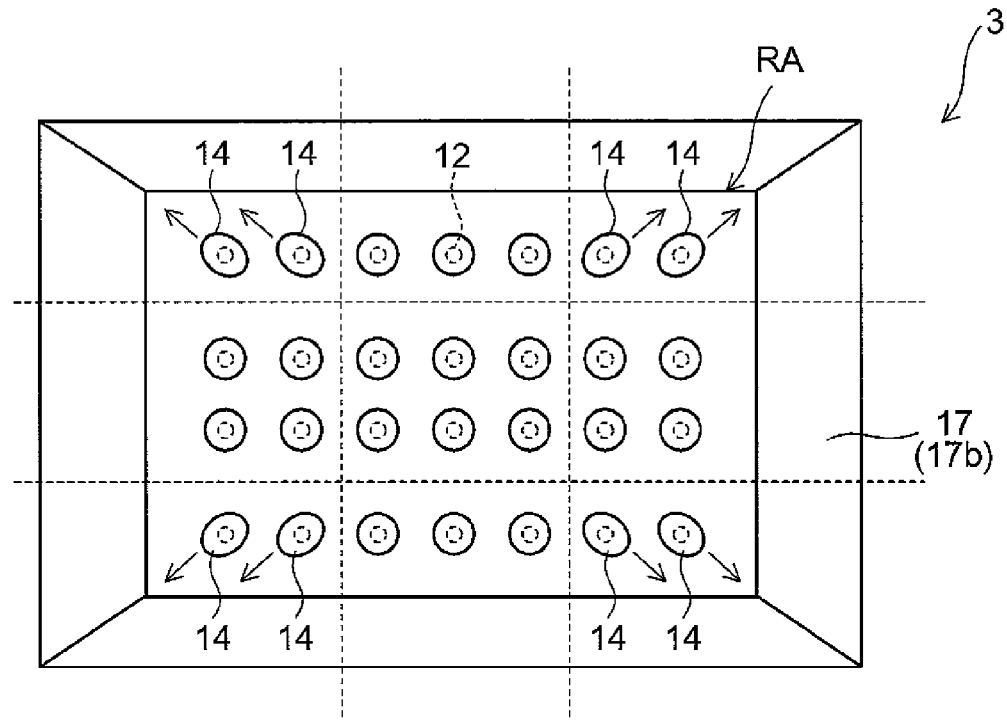
FIG. 17 is a plan view showing schematically another division example of the above rectangular region.

Here, FIG. 17 is a plan view showing schematically another division example of the rectangular region RA of the backlight 3 according to the present embodiment. In the meantime, in FIG. 17, for the sake of convenience, the illustration of the diffusion plate 15 and optical sheet 16 is skipped. As shown in the drawing, to dispose a plurality of the LEDs 12 in one division region, the rectangular region RA on the bottom plate 11a may be divided into a plurality of regions (e.g., a total of 9 regions of 3×3) and the diffusion lenses 14 corresponding to the plurality of LEDs 12 (two in FIG. 17) in each corner region P1 may be disposed such that the central axes C incline from the direction perpendicular to the mounting surface $11a_1$ (bottom plate 11a) toward the outer peripheral side of the rectangular region RA.

In this case, the amount of the light that is emitted from the LEDs 12 in the corner region P1 and supplied to the four corners of the illumination region via the diffusion lenses 14 increases compared to the structure in which only one diffusion lens 14 in the corner region P1 is inclined toward the outer peripheral side. Accordingly, it is possible to more alleviate the brightness decline at the four corners of the illumination region.

From the above description, it can be said preferable if the rectangular region RA in which the LEDs 12 are disposed has, at the four corners, the corner regions P1 in each of which at least one LED 12 is disposed and the diffusion lens 14 corresponding to the LED 12 located in each corner region P1 is disposed such that the central axis C thereof inclines from the direction perpendicular to the mounting surface $11a_1$ (bottom plate 11a) toward the outer peripheral side of the rectangular region RA.

Besides, in each corner region P1, if the diffusion lens 14 is disposed such that the central axis C of the diffusion lens 14 inclines from the direction perpendicular to the mounting surface $11a_1$ (bottom plate 11a) toward the outer peripheral side of the rectangular region RA, the direction in which the diffusion lens 14 inclines is not limited to a direction toward each apex of the four corners of the rectangular region RA.

Figure 18:
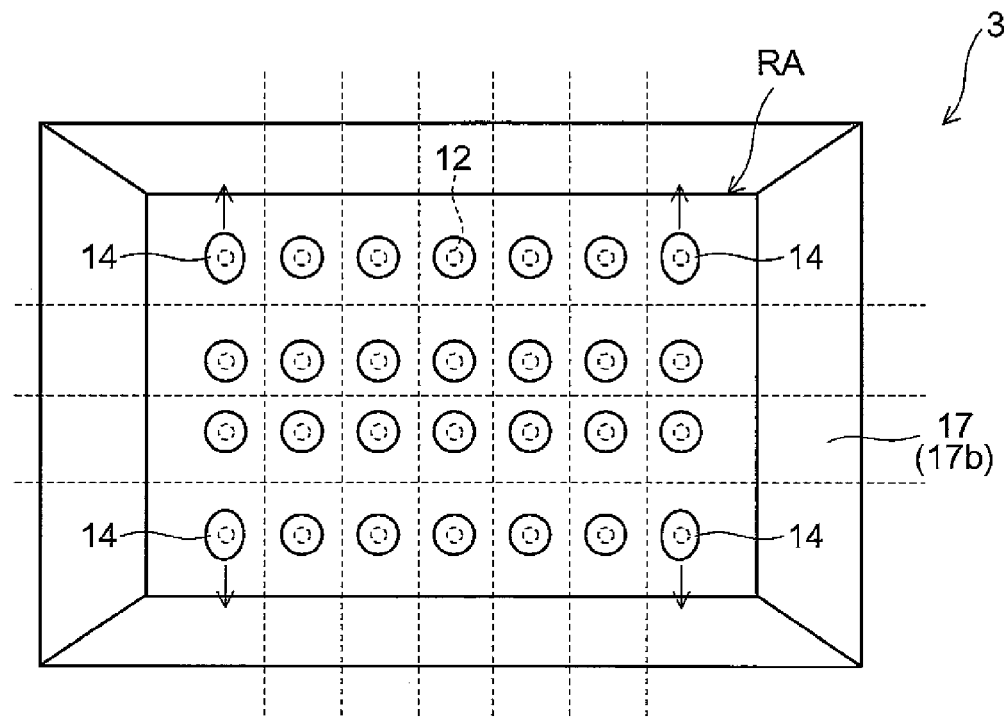
FIG. 18 is a plan view showing another structure of the above backlight.
Figure 19:
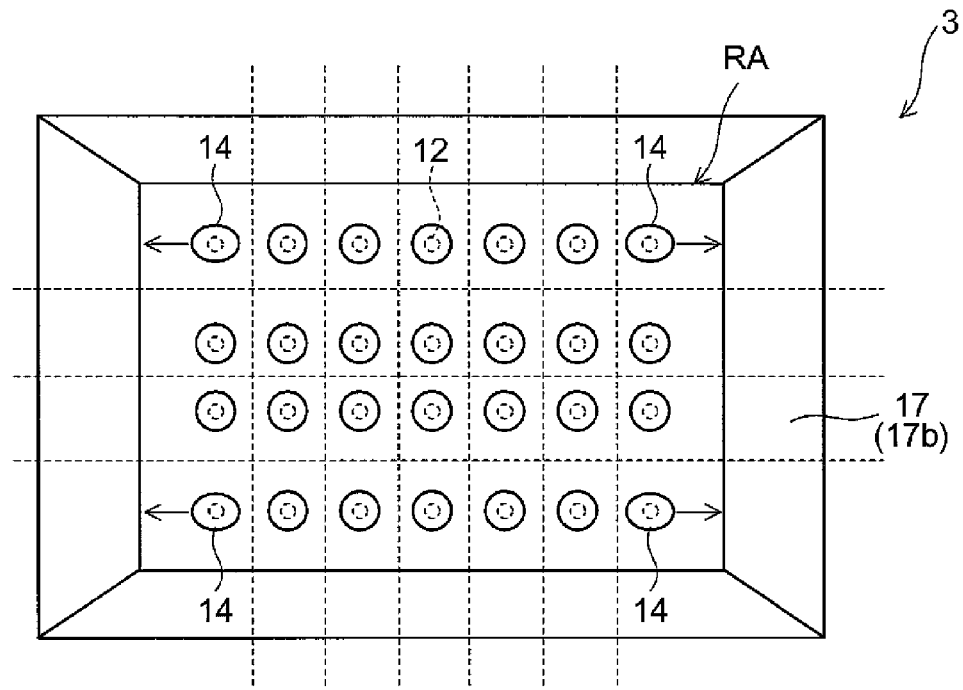
FIG. 19 is a plan view showing still another structure of the above backlight.

FIG. 18 is a plan view showing another structure of the backlight 3, and FIG. 19 is a plan view showing still another structure of the backlight 3. As shown in FIG. 18 and FIG. 19, the diffusion lens 14 in each corner region P1 may be disposed such that the central axis C thereof inclines from the direction perpendicular to the mounting surface $11a_1$ (bottom plate 11a) toward the long edge or the short edge of the rectangular region RA.

Figure 20:
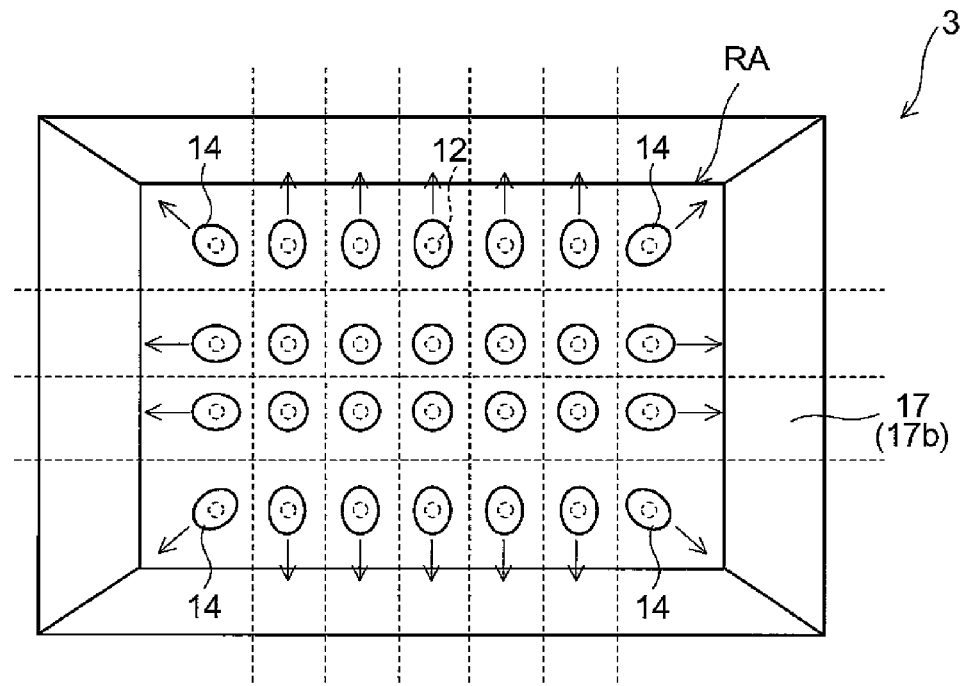
FIG. 20 is a plan view showing still another structure of the above backlight.

Besides, FIG. 20 is a plan view showing still another structure of the backlight 3. The diffusion lens 14 corresponding to the LED 12 located in the outer peripheral region P2 (see FIG. 3B, FIG. 5B) may be disposed such that the central axis C inclines from the direction perpendicular to the mounting surface $11a_1$ (bottom plate 11a) toward the outer peripheral side (long edge, short edge) of the rectangular region RA.

In this case, in a brightness distribution of the light that is emitted from the LED 12 in the outer peripheral region P2 and obtained via the diffusion lens 14, it is possible to raise the brightness on the outer peripheral side (side toward which the diffusion lens 14 inclines) of the rectangular region RA with respect to the axis (e.g., central axis D of the LED 12) that passes through the light emitting portion 12a and is perpendicular to the mounting surface $11a_1$ compared to the case where the diffusion lens 14 does not incline. In this way, it is possible to alleviate the brightness declining not only at the four corners of the illumination region but also at the outer peripheral portion, and it is possible to alleviate the frame-shaped brightness unevenness occurring on the display screen of the liquid crystal panel 2, for example. Accordingly, it is possible to further reduce the number of light sources in the outer peripheral region. In addition, by illuminating the central portion of the illumination region by means of the LEDs 12 located in the region (central region P3) inside the outer peripheral region P2, it is possible to obtain the above effects while securing the brightness at the central portion.

[Supplement]

It is of course possible to compose the backlight 3 and the liquid crystal display device 1 by suitably combining the above embodiments. Hereinafter, combinations of the embodiments are described.

Figure 21:
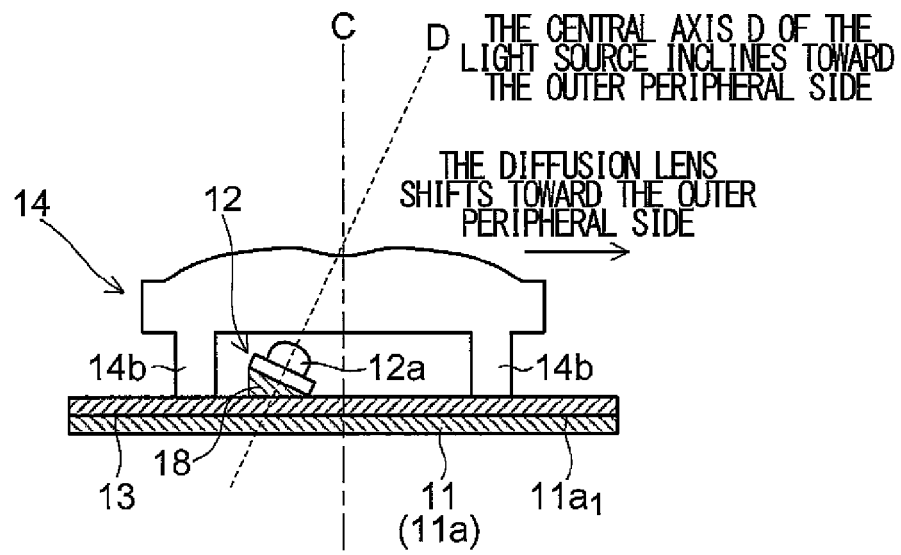
FIG. 21 is a cross-sectional view showing another disposition example of an LED and a diffusion lens in a corner region of the above rectangular region.

FIG. 21 is a cross-sectional view showing another disposition example of the LED 12 and diffusion lens 14 in the corner region P1 of the rectangular region RA. As shown in the drawing, the backlight 3 may have a structure obtained by combining the embodiments 1 and 2. In other words, the backlight 3 may be structured in such a way that (1) the LED 12 in each corner region P1 is disposed such that the central axis D thereof inclines from the direction perpendicular to the mounting surface $11a_1$ (bottom plate 11a) toward the outer peripheral side of the rectangular region RA and (2) the diffusion lens 14 in each corner region P1 is disposed such that the central axis C thereof is located at a position closer to the outer peripheral side of the rectangular region RA than the light emitting portion 12a of the LED 12.

In this structure, in the brightness distribution of the light that is emitted from the LED 12 in each corner region P1 and obtained via the diffusion lens 14, even in a case where the inclination angle (inclination angle to the direction perpendicular to the mounting surface $11a_1$) of the central axis D of the LED 12 is small, because of the above disposition of the diffusion lens 14, it is possible to raise the brightness on the outer peripheral side (side toward which the diffusion lens 14 deviates) of the rectangular region RA with respect to the axis that passes through the light emitting portion 12a and is perpendicular to the mounting surface $11a_1$. In this way, even in the case where the inclination angle of the central axis D of the LED 12 is small, it is possible to surely obtain the effect of alleviating the brightness declining at the four corners of the illumination region. Besides, in a case where the inclination angle of the central axis D of the LED 12 is enlarged, it is possible to further alleviate the brightness declining at the four corners of the illumination region in cooperation with the above disposition of the diffusion lens 14.

Figure 22:
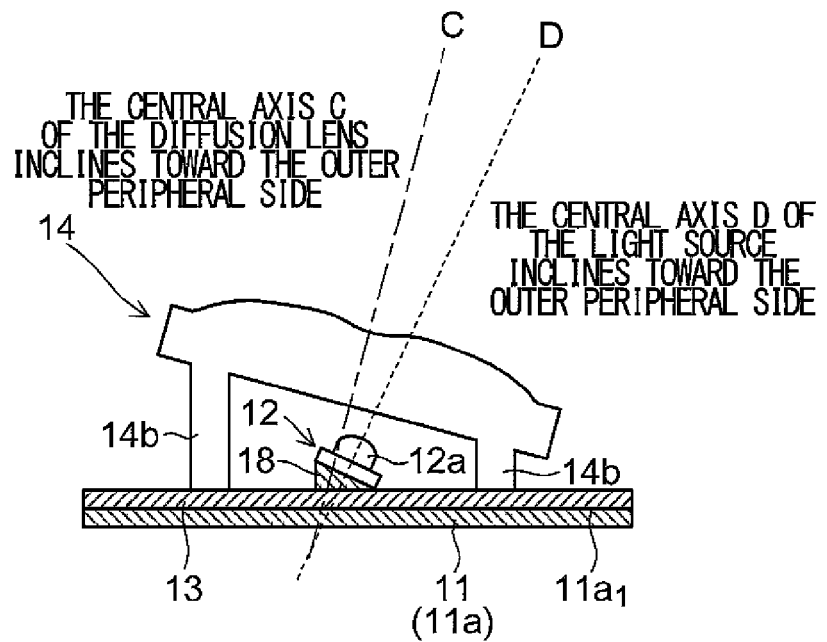
FIG. 22 is a cross-sectional view showing still another disposition example of an LED and a diffusion lens in a corner region of the above rectangular region.

Besides, FIG. 22 is a cross-sectional view showing still another disposition example of the LED 12 and diffusion lens 14 in the corner region P1 of the rectangular region RA. As shown in the drawing, the backlight 3 may have a structure obtained by combining the embodiments 1 and 3. In other words, the backlight 3 may be structured in such a way that (1) the LED 12 in each corner region P1 is disposed such that the central axis D thereof inclines from the direction perpendicular to the mounting surface $11a_1$ (bottom plate 11a) toward the outer peripheral side of the rectangular region RA and (2) the diffusion lens 14 in each corner region P1 is disposed such that the central axis C thereof inclines from the direction perpendicular to the mounting surface $11a_1$ (bottom plate 11a) toward the outer peripheral side of the rectangular region RA.

In this structure, in the brightness distribution of the light that is emitted from the LED 12 in each corner region P1 and obtained via the diffusion lens 14, even in a case where the inclination angle of the central axis D of the LED 12 is small, it is possible to raise the brightness on the outer peripheral side (side toward which the diffusion lens 14 inclines) of the rectangular region RA with respect to the axis that passes through the light emitting portion 12a and is perpendicular to the mounting surface $11a_1$. In this way, even in the case where the inclination angle of the central axis D of the LED 12 is small, it is possible to surely obtain the effect of alleviating the brightness declining at the four corners of the illumination region. Besides, in a case where the inclination angle of the central axis D of the LED 12 is enlarged, it is possible to further alleviate the brightness declining at the four corners of the illumination region in cooperation with the above disposition of the diffusion lens 14.

Figure 23:
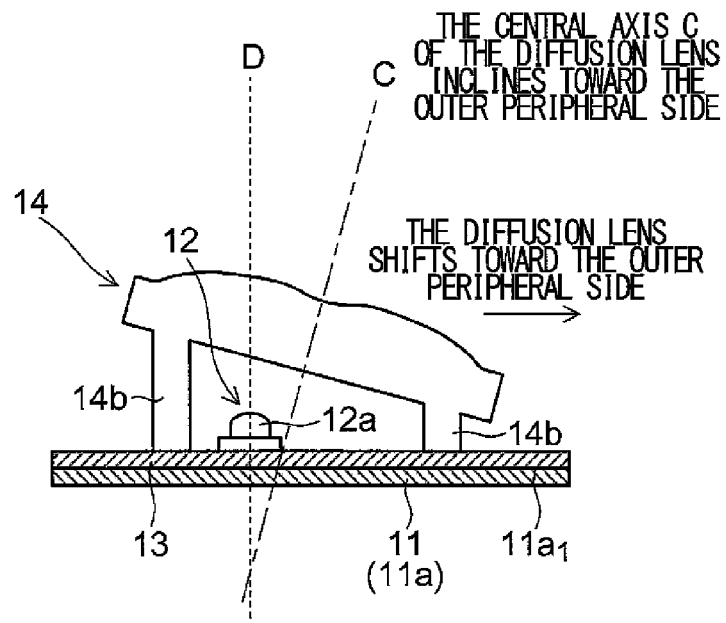
FIG. 23 is a cross-sectional view showing still another disposition example of an LED and a diffusion lens in a corner region of the above rectangular region.

Besides, FIG. 23 is a cross-sectional view showing still another disposition example of the LED 12 and diffusion lens 14 in the corner region P1 of the rectangular region RA. As shown in the drawing, the backlight 3 may have a structure obtained by combining the embodiments 2 and 3. In other words, the backlight 3 may be structured in such a way that (1) the diffusion lens 14 corresponding to the LED 12 in each corner region P1 is disposed such that the central axis C thereof is located at a position closer to the outer peripheral side of the rectangular region RA than the light emitting portion 12a of the LED 12 and (2) the diffusion lens 14 is disposed such that the central axis C thereof inclines from the direction perpendicular to the mounting surface $11a_1$ (bottom plate 11a) toward the outer peripheral side of the rectangular region RA.

In this structure, in the brightness distribution of the light that is emitted from the LED 12 in each corner region P1 and obtained via the diffusion lens 14, even in a case where the deviation amount of the diffusion lens 14 from the light emitting portion 12a is small, it is possible to raise the brightness on the outer peripheral side of the rectangular region RA with respect to the axis (e.g., central axis D of the LED 12) that passes through the light emitting portion 12a and is perpendicular to the mounting surface $11a_1$. In this way, even in the case where the deviation amount of the diffusion lens 14 from the light emitting portion 12a is small, it is possible to surely obtain the effect of alleviating the brightness declining at the four corners of the illumination region. Besides, in a case where the deviation amount of the diffusion lens 14 is enlarged, it is possible to further alleviate the brightness declining at the four corners of the illumination region in cooperation with the above inclination of the diffusion lens 14.

Figure 24:
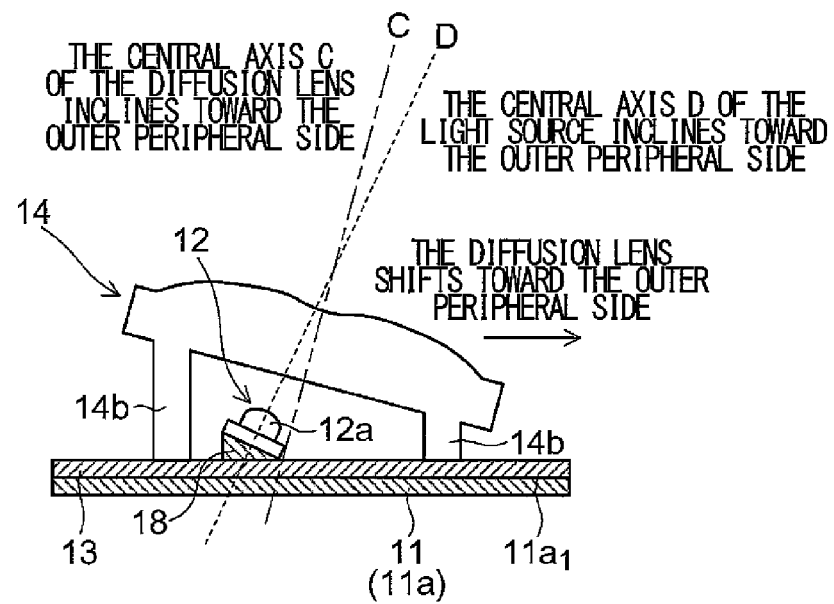
FIG. 24 is a cross-sectional view showing still another disposition example of an LED and a diffusion lens in a corner region of the above rectangular region.
Figure 25:
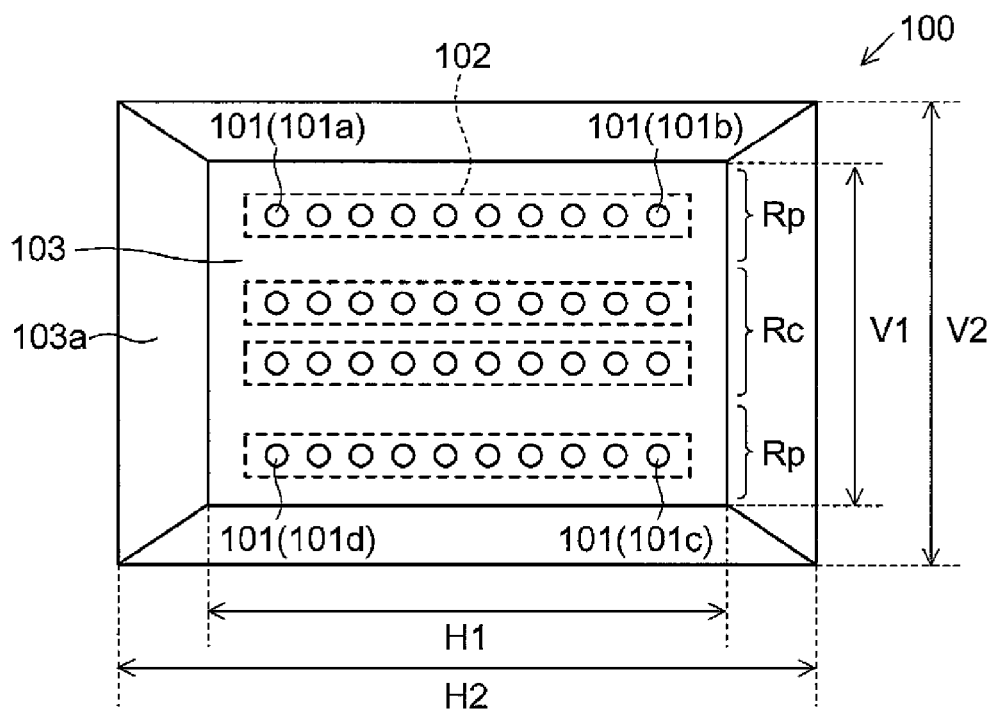
FIG. 25 is a plan view showing a structure of a conventional backlight.
Figure 26:
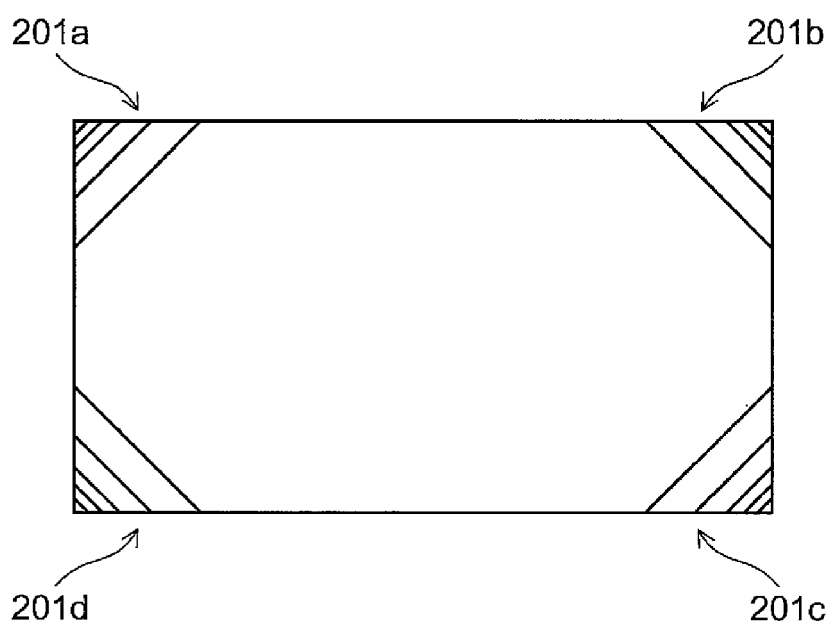
FIG. 26 is a plan view showing schematically a display screen of a liquid crystal panel illuminated by the backlight.

Besides, FIG. 24 is a cross-sectional view showing still another disposition example of the LED 12 and diffusion lens 14 in the corner region P1 of the rectangular region RA. As shown in the drawing, the backlight 3 may have a structure obtained by combining all the embodiments 1 to 3. In other words, the backlight 3 may be structured in such a way that (1) the LED 12 in each corner region P1 is disposed such that the central axis D thereof inclines from the direction perpendicular to the mounting surface $11a_1$ (bottom plate 11a) toward the outer peripheral side of the rectangular region RA, (2) the diffusion lens 14 corresponding to the LED 12 in each corner region P1 is disposed such that the central axis C thereof is located at a position closer to the outer peripheral side of the rectangular region RA than the light emitting portion 12a of the LED 12, further (3) the diffusion lens 14 is disposed such that the central axis C thereof inclines from the direction perpendicular to the mounting surface $11a_1$ (bottom plate 11a) toward the outer peripheral side of the rectangular region RA.

In this structure, in the brightness distribution of the light that is emitted from the LED 12 in each corner region P1 and obtained via the diffusion lens 14, even in a case where at least one of the inclination angle of the LED 12, the deviation amount of the diffusion lens 14 and the inclination angle of the diffusion lens 14 is small, it is possible to raise the brightness on the outer peripheral side of the rectangular region RA and to alleviate the brightness declining at the four corners of the illumination region. Besides, it is possible to significantly alleviate the brightness declining at the four corners of the illumination region by means of a synergy effect of the inclination of the LED 12, the deviation of the diffusion lens 14 and the inclination of the diffusion lens 14.

In the meantime, the planar light source device and liquid crystal display device represented in each embodiment are expressible as follows.

A planar light source device according to one embodiment of the present invention comprises a plurality of light sources, and a bottom plate that has a mounting surface on which the plurality of light sources are mounted, wherein the plurality of light sources are two-dimensionally disposed in a rectangular region of the mounting surface that is smaller than a size of the bottom plate, and disposition density of the light sources in the rectangular region is lower in a peripheral portion than in a central portion, wherein the rectangular region has, at four corners thereof corner regions where at least one of the light sources is disposed, and the light source located at each of the corner regions is disposed such that a central axis thereof inclines from a direction perpendicular to the mounting surface toward an outer peripheral side of the rectangular region.

According to the above structure, in the brightness distribution of the light emitted from the light source in each corner region, it is possible to raise the brightness on the side (outer peripheral side of the rectangular region) toward which the central axis inclines with respect to the axis that passes through the light source and is perpendicular to the mounting surface. In this way, even in the structure in which to achieve low cost by reduction in the number of light sources mounted, the disposition region for the light sources is made smaller than the size of the bottom plate and the disposition density of the light sources in the disposition region is made lower in the peripheral portion than in the central portion, it is possible to alleviate the brightness declining at the four corners of the illumination region by means of the illumination by the light source in each corner region.

In the above planar light source device, the light source located in each of the corner regions may be disposed such that the central axis thereof inclines from the direction perpendicular to the mounting surface toward each apex of the four corners of the rectangular region.

In this case, it is possible to surely supply the light to the four corners of the illumination region by means of the illumination by the light source in each corner region and to surely alleviate the brightness declining at the four corners of the illumination region.

The above planar light source device may include a diffusion lens that is disposed correspondingly to each of the plurality of light sources and diffuses the light emitted from the light source.

In this case, the light from the light source is diffused by the diffusion lens; accordingly, the brightness decline at the four corners becomes more inconspicuous. Besides, even in a case where the interval between neighboring light sources is large, dot-like unevenness becomes unlikely to occur in the brightness distribution by each light source; accordingly, it is possible to achieve low cost by further reducing the number of light sources mounted.

In each of the corner regions of the above planar light source device, the diffusion lens may be disposed such that a central axis thereof is located at a position closer to the outer peripheral side of the rectangular region than the light emitting portion of the light source.

In this structure, in the brightness distribution of the light that is emitted from the light source and obtained via the diffusion lens, it is possible to raise the brightness on the outer peripheral side (side toward which the diffusion lens deviates) of the rectangular region with respect to the axis that passes through the light emitting portion of the light source and is perpendicular to the mounting surface. In this way, even in the case where the inclination angle of the central axis of the light source is small, it is possible to surely alleviate the brightness declining at the four corners of the illumination region.

In each of the corner regions of the above planar light source device, the diffusion lens may be disposed such that the central axis thereof inclines from the direction perpendicular to the mounting surface toward the outer peripheral side of the rectangular region.

In this structure, in the brightness distribution of the light that is emitted from the light source and obtained via the diffusion lens, it is possible to raise the brightness on the side (outer peripheral side of the rectangular region) toward which the central axis of the diffusion lens inclines with respect to the axis that passes through the light emitting portion of the light source and is perpendicular to the mounting surface. In this way, even in the case where the inclination angle of the central axis of the light source is small, it is possible to surely alleviate the brightness declining at the four corners of the illumination region.

In the above planar light source device, when the rectangular region is divided into an outermost peripheral region including each of the corner regions and an inner region with respect to the outermost peripheral region, the light source located in the outermost peripheral region may be disposed such that the central axis thereof inclines from the direction perpendicular to the mounting surface toward the outer peripheral side of the rectangular region.

In this case, in the brightness distribution of the light emitted from the light source in the outermost peripheral region in the rectangular region, it is possible to raise the brightness on the side (outer peripheral side of the rectangular region) toward which the central axis inclines with respect to the axis that passes through the light source and is perpendicular to the mounting surface. In this way, it is possible to alleviate the brightness declining not only at the four corners of the illumination region but also at the outer peripheral portion, and it is possible to alleviate the frame-shaped brightness unevenness occurring. In addition, by illuminating the central portion of the illumination region by means of the light sources located in the region inside the outermost peripheral region, it is possible to obtain the above effects while securing the brightness at the central portion.

A planar light source device according to another embodiment of the present invention comprises a plurality of light sources, and a bottom plate that has a mounting surface on which the plurality of light sources are mounted, wherein the plurality of light sources are two-dimensionally disposed in a rectangular region of the mounting surface that is smaller than a size of the bottom plate, and disposition density of the light sources in the rectangular region is lower in a peripheral portion than in a central portion, the planar light source device further comprising a diffusion lens that is disposed correspondingly to each of the plurality of light sources and diffuses light emitted from the light source, wherein the rectangular region has, at four corners thereof, corner regions where at least one of the light sources is disposed, and the diffusion lens corresponding to the light source located in each of the corner regions is disposed such that a central axis thereof is located at a position closer to an outer peripheral side of the rectangular region than a light emitting portion of the light source.

According to the above structure, in the brightness distribution of the light that is emitted from the light source in each corner region and obtained via the diffusion lens, it is possible to raise the brightness on the outer peripheral side (side toward which the diffusion lens deviates) of the rectangular region with respect to the axis that passes through the light emitting portion of the light source and is perpendicular to the mounting surface. In this way, even in the structure in which to achieve low cost by reduction in the number of light sources mounted, the disposition region for the light sources is made smaller than the size of the bottom plate and the disposition density of the light sources in the disposition region is made lower in the peripheral portion than in the central portion, it is possible to alleviate the brightness declining at the four corners of the illumination region by means of the illumination by the light source in each corner region.

Besides, the light from the light source is diffused by the diffusion lens; accordingly, the brightness decline at the four corners becomes more inconspicuous. Besides, even in the case where the interval between neighboring light sources is large, the dot-like unevenness becomes unlikely to occur in the brightness distribution by each light source; accordingly, it is possible to achieve low cost by further reducing the number of light sources mounted.

In the above planar light source device, the diffusion lens may be disposed such that the central axis thereof is located at a position closer to each apex of the four corners of the rectangular region than the light emitting portion of the light source.

In this case, it is possible to surely supply the light to the four corners of the illumination region by means of the illumination by the light source in each corner region and to surely alleviate the brightness declining at the four corners of the illumination region.

In the above planar light source device, the diffusion lens may be disposed such that the central axis thereof inclines from the direction perpendicular to the mounting surface toward the outer peripheral side of the rectangular region.

In this structure, in the brightness distribution of the light that is emitted from the light source and obtained via the diffusion lens, it is possible to raise the brightness on the side (outer peripheral side of the rectangular region) toward which the central axis of the diffusion lens inclines with respect to the axis that passes through the light emitting portion of the light source and is perpendicular to the mounting surface. In this way, even in the case where the deviation amount of the diffusion lens with respect to the light source (light emitting portion) is small, it is possible to alleviate the brightness declining at the four corners of the illumination region.

In the above planar light source device, when the rectangular region is divided into the outermost peripheral region including each of the corner regions and the inner region with respect to the outermost peripheral region, the diffusion lens corresponding to the light source located in the outermost peripheral region may be disposed such that the central axis thereof is located at a position closer to the outer peripheral side of the rectangular region than the light emitting portion of the light source.

In this case, in the brightness distribution of the light that is emitted from the light source in the outermost peripheral region in the rectangular region and obtained via the diffusion lens, it is possible to raise the brightness on the outer peripheral side (side toward which the diffusion lens deviates) of the rectangular region with respect to the axis that passes through the light emitting portion of the light source and is perpendicular to the mounting surface. In this way, it is possible to alleviate the brightness declining not only at the four corners of the illumination region but also at the outer peripheral portion, and it is possible to alleviate the frame-shaped brightness unevenness occurring. In addition, by illuminating the central portion of the illumination region by means of the light sources located in the region inside the outermost peripheral region, it is possible to obtain the above effects while securing the brightness at the central portion.

A planar light source device according to still another embodiment of the present invention comprises a plurality of light sources, and a bottom plate that has a mounting surface on which the plurality of light sources are mounted, wherein the plurality of light sources are two-dimensionally disposed in a rectangular region of the mounting surface that is smaller than a size of the bottom plate, and disposition density of the light sources in the rectangular region is lower in a peripheral portion than in a central portion, the planar light source device further comprising a diffusion lens that is disposed correspondingly to each of the plurality of light sources and diffuses light emitted from the light source, wherein the rectangular region has, at four corners thereof, corner regions where at least one of the light sources is disposed, and the diffusion lens corresponding to the light source located in each of the corner regions is disposed such that a central axis thereof inclines from a direction perpendicular to the mounting surface toward an outer peripheral side of the rectangular region.

According to the above structure, in the brightness distribution of the light that is emitted from the light source in each corner region and obtained via the diffusion lens, it is possible to raise the brightness on the side (outer peripheral side of the rectangular region) toward which the central axis of the diffusion lens inclines with respect to the axis that passes through the light source and is perpendicular to the mounting surface. In this way, even in the structure in which to achieve low cost by reduction in the number of light sources mounted, the disposition region for the light sources is made smaller than the size of the mounting surface and the disposition density of the light sources in the disposition region is made lower in the peripheral portion than in the central portion, it is possible to alleviate the brightness declining at the four corners of the illumination region by means of the illumination by the light source in each corner region.

Besides, the light from the light source is diffused by the diffusion lens; accordingly, the brightness decline at the four corners of the illumination region becomes more inconspicuous. Besides, even in the case where the interval between the neighboring light sources is large, the dot-like unevenness becomes unlikely to occur in the brightness distribution by each light source; accordingly, it is possible to achieve low cost by further reducing the number of light sources mounted.

In the above planar light source device, the diffusion lens may be disposed such that the central axis thereof inclines from the direction perpendicular to the mounting surface toward each apex of the four corners of the rectangular region.

In this case, it is possible to surely supply the light to the four corners of the illumination region by means of the illumination by the light source in each corner region and to surely alleviate the brightness declining at the four corners of the illumination region.

In the above planar light source device, when the rectangular region is divided into the outermost peripheral region including each of the corner regions and the inner region with respect to the outermost peripheral region, the diffusion lens corresponding to the light source located in the outermost peripheral region may be disposed such that the central axis thereof inclines from the direction perpendicular to the mounting surface toward the outer peripheral side of the rectangular region.

In this case, in the brightness distribution of the light that is emitted from the light source in the outermost peripheral region in the rectangular region and obtained via the diffusion lens, it is possible to raise the brightness on the side (outer peripheral side of the rectangular region) toward which the central axis of the diffusion lens inclines with respect to the axis that passes through the light emitting portion of the light source and is perpendicular to the mounting surface. In this way, it is possible to alleviate the brightness declining not only at the four corners of the illumination region but also at the outer peripheral portion, and it is possible to alleviate the frame-shaped brightness unevenness occurring. In addition, by illuminating the central portion of the illumination region by means of the light sources located in the region inside the outermost peripheral region, it is possible to obtain the above effects while securing the brightness at the central portion.

In the above planar light source device, when two directions parallel to the mounting surface and perpendicular to each other are defined as a first direction and a second direction, each of the corner regions may be a region where both-end regions when the rectangular region is divided into three or more regions in the first direction and both-end regions when the rectangular region is divided into three or more regions in the second direction overlie each other.

In this case, it is possible to surely alleviate the brightness decline at the four corners of the illumination region by means of the light source located in each corner region while securing the illumination brightness in a region other than the four corners of the illumination region by means of the light source located in a region other than the corner region, and possible to alleviate the brightness unevenness of the entire illumination region.

The above planar light source device may be of direct type that illuminates an illumination target from right under in a planar manner by means of the plurality of light sources.

In the case of the direct type, the brightness decline easily occurs at the four corners of the illumination region because of the reduction in the number of light sources mounted compared to an edge-light type; accordingly, the structure according to each embodiment of the present invention becomes effective.

In the above planar light source device, the plurality of light sources each may be formed of a light emitting diode.

In the structure that uses an LED as the light source, the brightness decline easily occurs at the four corners of the illumination region because of the reduction in the number of light sources mounted compared to a structure that uses a tube-like light source (e.g., cold-cathode tube); accordingly, the structure according to each embodiment of the present invention becomes effective.

The above planar light source device may further include a reflection sheet that has an opening portion from which each of the plurality of light sources is exposed, is disposed on the bottom plate, and reflects the light emitted from the light source, wherein the reflection sheet may have an edge portion that rises obliquely from the bottom plate on the outer side of the rectangular region.

In the structure in which the peripheral portion of the illumination region is illuminated by means of the light that is emitted from the light source and reflected by the edge portion of the reflection sheet, the light source is not disposed in the peripheral portion of the bottom plate to form the edge portion; accordingly, it is possible to reduce the number of light sources mounted, but the light has difficulty in reaching the four corners of the illumination region. Accordingly, the structure according to each embodiment of the present invention, which is able alleviate the brightness decline at the four corners of the illumination region, becomes very effective in the case of achieving reduction in the number of light sources mounted by means of the illumination that uses the edge portion of the reflection sheet.

The liquid crystal display device represented in the embodiments of the present invention includes the above planar light source device and a liquid crystal panel that modulates the light supplied from the planar light source device to perform display.

In this structure, it is possible to alleviate the brightness declining at the four corners of the screen of the liquid crystal panel and improve the display quality.

INDUSTRIAL APPLICABILITY

The planar light source device according to the present invention is usable for a backlight of a liquid crystal display device, for example.

REFERENCE SIGNS LIST

1 liquid crystal display device
2 liquid crystal panel
3 backlight (planar light source device)
11*a* bottom plate
11*a*$_1$ mounting surface
12 LED (light source, light emitting diode)
14 diffusion lens
17 reflection sheet
17*a* opening portion
17*b* edge portion
C central axis
D central axis
P1 corner region
P2 outer peripheral region (outermost peripheral region)
P3 central region
RA rectangular region
Rc central portion
Rp peripheral portion

The invention claimed is:

1. A planar light source device comprising:
   a plurality of light sources;
   a bottom plate that has a mounting surface on which the plurality of light sources are mounted; and
   a diffusion lens that is disposed correspondingly to each of the plurality of light sources and diffuses light emitted from the corresponding light source, wherein
      the plurality of light sources are two-dimensionally disposed in a rectangular region of the mounting surface that is smaller than a size of the bottom plate, and disposition density of the light sources in the rectangular region is lower in a peripheral portion than in a central portion,
      the rectangular region has, at four corners thereof, corner regions where at least one of the light sources is disposed,
      the light source located in each of the corner regions is disposed such that central axis thereof inclines from a direction perpendicular to the mounting surface toward an outer peripheral side of the rectangular region, and
      the diffusion lens corresponding to the light source located in each of the corner regions is disposed so as to be deviated, with respect to the light source, toward an outer peripheral side of the rectangular region.

2. The planar light source device according to claim 1, wherein
   the light source located in each of the corner regions is disposed such that the central axis thereof inclines from the direction perpendicular to the mounting surface toward each apex of the four corners of the rectangular region.

3. The planar light source device according to claim 1, wherein in each of the corner regions, the diffusion lens is disposed such that a central axis thereof inclines from the direction perpendicular to the mounting surface toward the outer peripheral side of the rectangular region.

4. The planar light source device according to claim 1, wherein when the rectangular region is divided into an outermost peripheral region including each of the corner regions and an inner region with respect to the outermost peripheral region, the light source located in the outermost peripheral region is disposed such that the central axis thereof inclines from the direction perpendicular to the mounting surface toward the outer peripheral side of the rectangular region.

5. The planar light source device according to claim 1, wherein
when two directions parallel to the mounting surface and perpendicular to each other are defined as a first direction and a second direction, each of the corner regions is a region where both-end regions when the rectangular region is divided into three or more regions in the first direction and both-end regions when the rectangular region is divided into three or more regions in the second direction overlie each other.

6. The planar light source device according to claim 1, wherein the planar light source device is of direct type that illuminates an illumination target from right under in a planar manner by means of the plurality of light sources.

7. The planar light source device according to claim 1, wherein the plurality of light sources are each formed of a light emitting diode.

8. The planar light source device according to claim 1, further comprising
a reflection sheet that has an opening portion from which each of the plurality of light sources is exposed, is disposed on the bottom plate, and reflects light emitted from the light source, wherein
the reflection sheet has an edge portion that rises obliquely from the bottom plate on an outer side of the rectangular region.

9. A liquid crystal display device comprising:
the planar light source device according to claim 1, and
a liquid crystal panel that modulates light supplied from the planar light source device to perform display.

10. The planar light source device according to claim 1, wherein the diffusion lens is disposed so as to be shifted toward the outer peripheral side of the rectangular region from a position where a central axis of the diffusion lens passes through a light emitting portion of the light source in a direction perpendicular to the mounting surface.

11. A planar light source device comprising:
a plurality of light sources, and
a bottom plate that has a mounting surface on which the plurality of light sources are mounted, wherein
the plurality of light sources are two-dimensionally disposed in a rectangular region of the mounting surface that is smaller than a size of the bottom plate, and disposition density of the light sources in the rectangular region is lower in a peripheral portion than in a central portion,
the planar tight source device further comprising a diffusion lens that is disposed correspondingly to each of the plurality of light sources and diffuses light emitted from the light source, wherein the rectangular region has, at four corners thereof, corner regions where at least one of the light sources is disposed, and
the diffusion lens corresponding to the light source located in each of the corner regions is disposed so as to be deviated, with respect to the light source, toward an outer peripheral side of the rectangular region.

12. The planar light source device according to claim 11, wherein the diffusion lens is disposed so as to be deviated, with respect to the light source, toward to each apex of the four corners of the rectangular region.

13. The planar light source device according to claim 11, wherein the diffusion lens is disposed such that the central axis thereof inclines from a direction perpendicular to the mounting surface toward the outer peripheral side the rectangular region.

14. The planar light source device according to claim 11, wherein when the rectangular region is divided into an outermost peripheral region including each of the corner regions and an inner region with respect to the outermost peripheral region, the diffusion lens corresponding to the light source located in the outermost peripheral region is disposed so as to be deviated, with respect to the light source, toward the outer peripheral side of the rectangular region than the light emitting portion of the light source.

15. A liquid crystal display device comprising:
the planar light source devise according to claim 11, and
a liquid crystal panel that modulates light supplied from the planar light source device to perform display.

16. The planar light source device according to claim 11, wherein the diffusion lens is disposed so as to be shifted toward the outer peripheral side of the rectangular region from a position where a central axis of the diffusion lens passes through a light emitting portion of the light source in a direction perpendicular to the mounting surface.

17. The planar light source device according to claim 11, wherein when two directions parallel to the mounting surface and perpendicular to each other are defined as a first direction and a second direction, each of the corner regions is a region where both-end regions when the rectangular region is divided into three or more regions in the first direction and both-end regions when the rectangular region is divided into three or more regions in the second direction overlie each other.

18. The planar light source device according to claim 11, wherein the planar light source device is of direct type that illuminates an illumination target from right under in a planar manner by means of the plurality of light sources.

19. The planar light source device according to claim 11, wherein the plurality of light sources are each formed of a light emitting diode.

20. The planar light source device according to claim 11, further comprising
a reflection sheet that has an opening portion from which each of the plurality of light sources is exposed, is disposed on the bottom plate, and reflects light emitted from the light source, wherein
the reflection sheet has an edge portion that rises obliquely from the bottom plate on an outer side of the rectangular region.

* * * * *